United States Patent
Pham et al.

(10) Patent No.: US 10,633,174 B2
(45) Date of Patent: Apr. 28, 2020

(54) MOBILE OILFIELD MATERIAL TRANSFER UNIT

(71) Applicant: SCHLUMBERGER TECHNOLOGY CORPORATION, Sugar Land, TX (US)

(72) Inventors: Hau Nguyen-Phuc Pham, Houston, TX (US); William Troy Huey, Fulshear, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 187 days.

(21) Appl. No.: 14/449,206

(22) Filed: Aug. 1, 2014

(65) Prior Publication Data

US 2015/0044004 A1 Feb. 12, 2015

Related U.S. Application Data

(63) Continuation-in-part of application No. PCT/US2013/054287, filed on Aug. 9, 2013.

(Continued)

(51) Int. Cl.
*B65D 88/54* (2006.01)
*B65D 88/30* (2006.01)
(Continued)

(52) U.S. Cl.
CPC .............. *B65D 88/54* (2013.01); *B65D 88/30* (2013.01); *B65D 88/32* (2013.01); *B65G 65/32* (2013.01); *B65G 67/24* (2013.01)

(58) Field of Classification Search
CPC ........ B65D 88/30; B65D 88/32; B65D 88/54; B65G 65/32; B65G 67/24; B65G 67/30
(Continued)

(56) References Cited

U.S. PATENT DOCUMENTS

| 559,965 A | 5/1896 | Bierstadt |
| 896,233 A | 8/1908 | McQueen |

(Continued)

FOREIGN PATENT DOCUMENTS

| CA | 2552581 C | 2/2009 |
| CA | 2643743 C | 4/2011 |

(Continued)

OTHER PUBLICATIONS

U.S. Appl. No. 14/318,095, filed Jun. 27, 2014, incorporated by reference herein.

(Continued)

*Primary Examiner* — James Keenan
(74) *Attorney, Agent, or Firm* — Cathy Hewitt

(57) ABSTRACT

A mobile oilfield material transfer unit includes a chassis having a gooseneck and support base, the support base including a first portion and second portion, and the chassis further comprising a rear axle suspension system coupled with at least two wheels for movably supporting the chassis. The mobile oilfield material transfer unit further includes an erecting mast assembly having a mast movably connected with the chassis proximate to the second portion, and an actuator system coupled with the mast and with the chassis for moving the mast between a horizontal position and a vertical position. At least two vertical conveyor assemblies may be coupled with the erecting mast and moveable between the horizontal position and the vertical position, and at least two horizontal conveyor systems may be coupled with the support frame and engageable with the at least two vertical conveyor assemblies. Each of the at least two horizontal conveyor systems may have a horizontal section with an inlet and an inclinable section with a discharge chute. Also, each of the at least two horizontal (Continued)

conveyor systems may be adapted to move a volume of oilfield material from the inlet to the discharge chute.

19 Claims, 17 Drawing Sheets

Related U.S. Application Data

(60) Provisional application No. 61/863,519, filed on Aug. 8, 2013.

(51) Int. Cl.
  *B65G 65/32* (2006.01)
  *B65G 67/24* (2006.01)
  *B65D 88/32* (2006.01)

(58) Field of Classification Search
  USPC ................................ 414/572, 573, 574
  See application file for complete search history.

(56) References Cited

U.S. PATENT DOCUMENTS

| | | | |
|---|---|---|---|
| 1,526,527 A | 2/1925 | Butler | |
| 1,560,826 A | 11/1925 | Kirschbraun | |
| 1,576,940 A | 3/1926 | Warner | |
| 2,073,652 A | 3/1937 | Robb | |
| 2,099,898 A | 11/1937 | Larkin | |
| 2,357,583 A | 9/1944 | Franco | |
| 2,735,839 A | 2/1956 | Schrenk | |
| 2,774,497 A * | 12/1956 | Martin | B62D 53/065 280/441.2 |
| 2,792,262 A | 5/1957 | Hathorn | |
| 2,858,950 A | 11/1958 | Martin | |
| 3,155,248 A | 11/1964 | Haller | |
| 3,170,560 A * | 2/1965 | Obmascher | B65G 67/00 198/307.1 |
| 3,208,616 A * | 9/1965 | Haskins | B65D 88/30 414/332 |
| 3,263,436 A | 8/1966 | Goldfarb | |
| 3,314,557 A | 4/1967 | Sackett | |
| 3,394,961 A | 7/1968 | Matte | |
| 3,451,986 A | 6/1969 | Metais | |
| 3,490,632 A | 1/1970 | McKinney | |
| 3,497,327 A | 2/1970 | Kehse | |
| 3,560,053 A | 2/1971 | Ortloff | |
| 3,618,801 A | 11/1971 | Blanchard | |
| 3,666,129 A | 5/1972 | Haskins | |
| 3,687,319 A | 8/1972 | Adam | |
| 3,743,108 A | 7/1973 | Visser | |
| 3,756,443 A | 9/1973 | Verschage et al. | |
| 3,787,479 A | 1/1974 | Grehl et al. | |
| 3,842,910 A | 10/1974 | Zingg et al. | |
| 3,883,019 A * | 5/1975 | Hansen, Jr. | B62D 53/065 280/441.2 |
| 3,883,148 A | 5/1975 | Miller | |
| 3,894,645 A * | 7/1975 | Verschage | B62D 53/065 280/441.2 |
| 3,938,673 A | 2/1976 | Perry, Jr. | |
| 3,974,602 A | 8/1976 | Pohl et al. | |
| 3,985,254 A | 10/1976 | Grandury | |
| 3,998,433 A | 12/1976 | Iwako | |
| 4,026,441 A | 5/1977 | Jones | |
| 4,077,612 A | 3/1978 | Ricciardi | |
| 4,079,150 A | 3/1978 | Beck et al. | |
| 4,090,623 A | 5/1978 | Noyon | |
| 4,103,793 A | 8/1978 | Weaver | |
| 4,111,314 A | 9/1978 | Nelson | |
| 4,187,047 A * | 2/1980 | Squifflet, Sr. | B60P 3/40 414/332 |
| 4,209,278 A | 6/1980 | Cooper et al. | |
| 4,222,498 A | 9/1980 | Brock | |
| 4,248,359 A | 2/1981 | Brock | |
| 4,249,848 A | 2/1981 | Griffin et al. | |
| 4,268,208 A | 5/1981 | Hankins et al. | |
| 4,337,014 A * | 6/1982 | Farnham | E04H 7/30 414/332 |
| 4,348,146 A * | 9/1982 | Brock | B65D 88/30 414/332 |
| 4,373,857 A * | 2/1983 | Giles | B60P 3/068 410/4 |
| 4,375,343 A | 3/1983 | Butler | |
| 4,400,126 A * | 8/1983 | Desourdy | B65G 65/32 366/30 |
| 4,427,133 A | 1/1984 | Kierbow et al. | |
| 4,453,829 A | 6/1984 | Althouse, III | |
| 4,465,420 A * | 8/1984 | Dillman | B60P 1/04 414/332 |
| 4,561,821 A | 12/1985 | Dillman | |
| 4,579,496 A | 4/1986 | Gerlach | |
| 4,601,628 A | 7/1986 | Lowing | |
| 4,621,972 A | 11/1986 | Grotte | |
| 4,626,166 A | 12/1986 | Jolly | |
| 4,671,665 A | 6/1987 | McIntire | |
| 4,701,095 A * | 10/1987 | Berryman | B65D 88/30 198/311 |
| 4,775,275 A * | 10/1988 | Perry | B65D 88/30 366/18 |
| 4,808,004 A | 2/1989 | McIntire et al. | |
| 4,832,561 A | 5/1989 | Nijenhuis | |
| 4,850,750 A | 7/1989 | Cogbill et al. | |
| 4,855,960 A | 8/1989 | Janssen et al. | |
| 4,883,363 A | 11/1989 | Pillon et al. | |
| 4,899,832 A | 2/1990 | Bierscheid | |
| 4,907,712 A | 3/1990 | Stempin | |
| 4,917,560 A * | 4/1990 | Murray | B65D 88/30 414/21 |
| 4,925,358 A | 5/1990 | Cook | |
| 4,944,646 A * | 7/1990 | Edwards | B28C 9/0418 280/6.157 |
| 5,006,034 A | 4/1991 | Bragg et al. | |
| 5,018,932 A | 5/1991 | Croisier | |
| 5,035,269 A | 7/1991 | Pytryga et al. | |
| 5,046,856 A | 9/1991 | McIntire | |
| 5,052,486 A | 10/1991 | Wilson | |
| 5,121,989 A | 6/1992 | Horton et al. | |
| 5,190,374 A | 3/1993 | Harms et al. | |
| 5,195,861 A | 3/1993 | Handke | |
| 5,201,498 A | 4/1993 | Akins | |
| 5,236,261 A | 8/1993 | Hagenbuch | |
| 5,339,996 A | 8/1994 | Dubbert et al. | |
| 5,362,193 A | 11/1994 | Milstead | |
| 5,382,411 A | 1/1995 | Allen | |
| 5,387,736 A | 2/1995 | Salomone et al. | |
| 5,413,154 A | 5/1995 | Hurst et al. | |
| 5,426,137 A | 6/1995 | Allen | |
| 5,427,497 A | 6/1995 | Dillman | |
| 5,667,298 A | 9/1997 | Musil et al. | |
| 5,775,713 A * | 7/1998 | Peterson | B62D 53/065 280/425.2 |
| 5,777,234 A | 7/1998 | Kosmal | |
| 5,785,421 A | 7/1998 | Milek | |
| 5,795,062 A | 8/1998 | Johnson | |
| 5,822,930 A | 10/1998 | Klein | |
| 6,000,840 A | 12/1999 | Paterson | |
| 6,050,743 A | 4/2000 | Medinger | |
| 6,186,195 B1 | 2/2001 | Anstotz | |
| 6,186,654 B1 | 2/2001 | Gunteret et al. | |
| 6,193,402 B1 | 2/2001 | Grimland et al. | |
| 6,286,986 B2 | 9/2001 | Grimland et al. | |
| 6,293,689 B1 | 9/2001 | Guntert, Jr. et al. | |
| 6,447,674 B1 | 9/2002 | Simon et al. | |
| 6,474,926 B2 * | 11/2002 | Weiss | B28C 7/0495 414/332 |
| 6,491,421 B2 | 12/2002 | Rondeau et al. | |
| 6,527,428 B2 | 3/2003 | Guntert, Jr. et al. | |
| 6,832,851 B1 | 12/2004 | Von Wilcken | |
| 6,939,031 B2 | 9/2005 | Pham et al. | |
| 6,948,535 B2 | 9/2005 | Stegemoeller et al. | |
| 7,048,432 B2 | 5/2006 | Phillippi et al. | |
| 7,104,328 B2 | 9/2006 | Phillippi et al. | |
| 7,214,028 B2 | 5/2007 | Boasso et al. | |

(56) References Cited

U.S. PATENT DOCUMENTS

| | | | |
|---|---|---|---|
| 7,258,522 B2 | 8/2007 | Pham et al. | |
| 7,308,953 B2 | 12/2007 | Barnes | |
| 7,419,296 B2 | 9/2008 | Allen | |
| 7,540,308 B2 | 6/2009 | Pessin et al. | |
| 7,614,451 B2 | 11/2009 | Blaschke et al. | |
| 7,703,518 B2 | 4/2010 | Phillippi et al. | |
| 7,815,222 B2 | 10/2010 | Markham | |
| 7,836,949 B2 | 11/2010 | Dykstra | |
| 7,837,427 B2 | 11/2010 | Beckel et al. | |
| 7,841,394 B2 | 11/2010 | McNeel et al. | |
| 7,845,413 B2 | 12/2010 | Shampine et al. | |
| 7,866,881 B2 | 1/2011 | El Kholy et al. | |
| 7,921,914 B2 | 4/2011 | Bruins et al. | |
| 7,926,564 B2 | 4/2011 | Phillippi et al. | |
| 7,931,088 B2 | 4/2011 | Stegemoeller et al. | |
| 8,066,955 B2 | 11/2011 | Pinchot | |
| 8,083,083 B1 | 12/2011 | Mohns | |
| 8,127,844 B2 | 3/2012 | Luharuka et al. | |
| 8,137,051 B2 | 3/2012 | Glenn et al. | |
| 8,142,134 B2 | 3/2012 | Lavoie et al. | |
| 8,146,665 B2 | 4/2012 | Neal et al. | |
| 8,313,269 B2 | 11/2012 | Fisher et al. | |
| 8,354,602 B2 | 1/2013 | Lucas et al. | |
| 8,585,341 B1 | 11/2013 | Oren et al. | |
| 8,651,792 B2 | 2/2014 | Friesen | |
| 8,661,743 B2 | 3/2014 | Flusche | |
| 8,726,584 B1 | 5/2014 | Nolte et al. | |
| 8,734,081 B2 | 5/2014 | Stegemoeller et al. | |
| 8,931,996 B2 | 1/2015 | Friesen et al. | |
| 8,944,740 B2 * | 2/2015 | Teichrob | B65G 63/008 414/332 |
| 9,017,001 B1 * | 4/2015 | Dueck | B65G 65/32 414/298 |
| 9,097,033 B2 | 8/2015 | Margevicius et al. | |
| 9,457,335 B2 | 10/2016 | Pham et al. | |
| 9,475,029 B2 | 10/2016 | McSpadden et al. | |
| 9,663,303 B2 * | 5/2017 | Waldner | B65G 17/126 |
| 9,688,178 B2 | 6/2017 | Pham | |
| 2002/0034120 A1 | 3/2002 | Guntert, Jr. et al. | |
| 2002/0147370 A1 | 10/2002 | Hinz et al. | |
| 2003/0150494 A1 | 8/2003 | Morgan et al. | |
| 2003/0161212 A1 | 8/2003 | Neal et al. | |
| 2003/0196809 A1 | 10/2003 | Willberg et al. | |
| 2003/0202869 A1 | 10/2003 | Posch | |
| 2003/0227817 A1 | 12/2003 | Martel et al. | |
| 2004/0008571 A1 | 1/2004 | Coody et al. | |
| 2004/0209780 A1 | 10/2004 | Harris et al. | |
| 2004/0256106 A1 | 12/2004 | Phillippi et al. | |
| 2005/0028979 A1 | 2/2005 | Brannon et al. | |
| 2005/0067351 A1 | 3/2005 | Graham | |
| 2005/0091941 A1 | 5/2005 | Baird | |
| 2005/0123385 A1 * | 6/2005 | Kirsch | B65G 67/24 414/573 |
| 2005/0201197 A1 | 9/2005 | Duell et al. | |
| 2006/0028914 A1 | 2/2006 | Phillippi et al. | |
| 2006/0065400 A1 | 3/2006 | Smith | |
| 2006/0107998 A1 | 5/2006 | Kholy et al. | |
| 2006/0289166 A1 | 12/2006 | Stromquist et al. | |
| 2007/0014653 A1 | 1/2007 | Glenn et al. | |
| 2007/0114035 A1 | 5/2007 | Parris et al. | |
| 2007/0179326 A1 | 8/2007 | Baker | |
| 2007/0201305 A1 | 8/2007 | Heilman et al. | |
| 2008/0008562 A1 | 1/2008 | Beckel et al. | |
| 2008/0066911 A1 | 3/2008 | Luharuka et al. | |
| 2008/0073895 A1 | 3/2008 | Herman et al. | |
| 2008/0179054 A1 | 7/2008 | McGough et al. | |
| 2008/0264641 A1 | 10/2008 | Slabaugh et al. | |
| 2009/0078410 A1 | 3/2009 | Krenek et al. | |
| 2009/0078792 A1 | 3/2009 | Vlasak | |
| 2010/0038077 A1 | 2/2010 | Heilman et al. | |
| 2010/0071284 A1 | 3/2010 | Hagan et al. | |
| 2010/0243251 A1 | 3/2010 | Luharuka et al. | |
| 2010/0188926 A1 | 7/2010 | Stegemoeller et al. | |
| 2010/0243252 A1 | 9/2010 | Luharuka et al. | |
| 2010/0243255 A1 | 9/2010 | Luharuka et al. | |
| 2010/0278621 A1 | 11/2010 | Redekop | |
| 2010/0319921 A1 | 12/2010 | Eia et al. | |
| 2010/0329072 A1 | 12/2010 | Hagan et al. | |
| 2011/0003720 A1 | 1/2011 | Sullivan | |
| 2011/0061855 A1 | 3/2011 | Case et al. | |
| 2011/0063942 A1 | 3/2011 | Hagan et al. | |
| 2011/0127178 A1 | 6/2011 | Claussen | |
| 2011/0197536 A1 | 8/2011 | Clark | |
| 2012/0024738 A1 | 2/2012 | Herman et al. | |
| 2012/0048537 A1 | 3/2012 | Rettie et al. | |
| 2012/0127820 A1 | 5/2012 | Noles, Jr. | |
| 2012/0127822 A1 | 5/2012 | Noles, Jr. | |
| 2012/0128449 A1 | 5/2012 | Fikes et al. | |
| 2012/0134772 A1 | 5/2012 | Herman et al. | |
| 2012/0167485 A1 | 7/2012 | Trevithick et al. | |
| 2012/0219391 A1 | 8/2012 | Teichrob et al. | |
| 2012/0255734 A1 | 10/2012 | Coli et al. | |
| 2012/0273206 A1 | 11/2012 | Zamora et al. | |
| 2012/0298210 A1 | 11/2012 | Pham et al. | |
| 2013/0105166 A1 | 5/2013 | Medvedev et al. | |
| 2013/0142601 A1 | 6/2013 | McIver et al. | |
| 2013/0150268 A1 | 6/2013 | Oldham | |
| 2013/0269735 A1 | 10/2013 | Roetzel et al. | |
| 2013/0288934 A1 | 10/2013 | Powell et al. | |
| 2013/0309052 A1 | 11/2013 | Luharuka et al. | |
| 2013/0324444 A1 | 12/2013 | Lesko et al. | |
| 2014/0041317 A1 | 2/2014 | Pham et al. | |
| 2014/0041319 A1 | 2/2014 | Pham et al. | |
| 2014/0041322 A1 | 2/2014 | Pham et al. | |
| 2014/0044508 A1 | 2/2014 | Pham et al. | |
| 2014/0166647 A1 | 6/2014 | Sheesley et al. | |
| 2014/0255265 A1 | 9/2014 | Kulkarni et al. | |
| 2015/0064077 A1 | 3/2015 | McSpadden et al. | |
| 2015/0166260 A1 | 6/2015 | Pham et al. | |
| 2015/0238912 A1 | 8/2015 | Luharuka et al. | |
| 2015/0238913 A1 | 8/2015 | Luharuka et al. | |
| 2015/0238914 A1 | 8/2015 | Luharuka et al. | |
| 2015/0240148 A1 | 8/2015 | Luharuka et al. | |
| 2016/0129418 A1 | 5/2016 | Pham et al. | |
| 2016/0130924 A1 | 5/2016 | Pham et al. | |
| 2017/0327309 A1 | 11/2017 | Hunter et al. | |

FOREIGN PATENT DOCUMENTS

| | | |
|---|---|---|
| CN | 2601189 Y | 1/2004 |
| CN | 2693601 Y | 4/2005 |
| CN | 101434836 A | 5/2009 |
| CN | 201317413 Y | 9/2009 |
| CN | 201458370 U | 5/2010 |
| CN | 201610285 U | 10/2010 |
| CN | 202398329 U | 8/2012 |
| CN | 202506322 U | 10/2012 |
| CN | 203486442 U | 3/2014 |
| CN | 103721619 A | 4/2014 |
| CN | 204109871 U | 1/2015 |
| EP | 0048312 A1 | 3/1982 |
| EP | 0241056 A1 | 2/1987 |
| EP | 0241056 A1 | 10/1987 |
| EP | 2449205 A2 | 5/2012 |
| EP | 2609999 A1 | 7/2013 |
| FR | 2655007 A1 | 5/1991 |
| JP | S5715828 A | 1/1982 |
| JP | 2000103497 A | 4/2000 |
| KR | 10-0589613 B1 | 6/2006 |
| RU | 10418 U1 | 7/1999 |
| RU | 2228842 C2 | 1/2004 |
| SU | 1341161 A1 | 9/1987 |
| WO | 8500046 A1 | 1/1985 |
| WO | 1985000046 | 1/1985 |
| WO | 0244517 A1 | 6/2002 |
| WO | 03087182 A2 | 10/2003 |
| WO | 2007022300 A2 | 2/2007 |
| WO | 2007098606 A1 | 9/2007 |
| WO | 2010070599 A1 | 6/2010 |
| WO | 2011061503 A1 | 5/2011 |
| WO | 2011088493 A1 | 7/2011 |
| WO | 2012121896 A2 | 9/2012 |
| WO | 2012166590 A1 | 12/2012 |

(56) References Cited

FOREIGN PATENT DOCUMENTS

| | | |
|---|---|---|
| WO | 2013099826 A1 | 7/2013 |
| WO | 2013134624 A1 | 9/2013 |
| WO | 2014028317 A1 | 2/2014 |

OTHER PUBLICATIONS

Office Action issued in U.S. Appl. No. 13/839,368 dated Apr. 14, 2017; 19 pages.
Office Action issued in Chinese Patent Application No. 201410566169.3 dated Apr. 26, 2016; 10 pages (with English translation).
Office Action issued in Chinese Patent Application No. 201380048297.2 dated Sep. 23, 2016; 17 pages (with English translation).
Examination Report issued in Australian Patent Appl. No. 2013302969 dated Dec. 8, 2016; 5 pages.
Decision on Grant issued in Russian Patent Appl. No. 2017102359 dated Jul. 27, 2018; 15 pages (with English translation).
Office Action issued in Chinese Patent Appl. No. 201580034894.9 dated Jul. 3, 2018; 9 pages (with English translation).
Decision on Grant issued in Russian Patent Appl. No. 2014132435 dated Sep. 20, 2018; 23 pages (with English translation).
Office Action issued in Russian Patent Appl. No. 2015117770 dated Nov. 16, 2018; 16 pages (with English Translation).
Office Action issued in Russian Patent Appl. No. 2015117758 dated Dec. 5, 2018; 13 pages (with English translation).
Office Action issued in Chinese Patent Appl. No. 201580036796.9 dated Oct. 25, 2018; 29 pages (with English translation).
Office Action issued in Chinese Patent Appl. No. 2015800109793 dated Sep. 12, 2018; 32 pages (with English translation).
Office Action issued in Chinese Patent Appl. No. 201580032114.7 dated Jul. 18, 2018; 15 pages.
Office Action issued in Eurasian Patent Appl. No. 201691737/31 dated Mar. 19, 2018; 4 pages (with English translation).
International Search Report and Written Opinion issued in PCT/US2015/030287 dated Jul. 29, 2015; 14 pages.
Extended Search Report issued in European Patent Appl. No. 15755550.9 dated Oct. 9, 2017; 8 pages.
International Search Report and Written Opinion issued in PCT/US2015/017175 dated May 28, 2015, 16 pages.
International Search Report and Written Opinion issued in PCT/US2015/059177 dated Feb. 17, 2016; 14 pages.
International Search Report and Written Opinion issued in PCT/US2015/059182 dated Feb. 29, 2016; 13 pages.
Examination Report dated Dec. 19, 2018 in corresponding AU Application No. 2015259393; 4 pages.

* cited by examiner

MOBILE OILFIELD MATERIAL TRANSFER UNIT

RELATED APPLICATION INFORMATION

This application is a continuation-in-part application of and claims the benefit of International Patent Application Serial Number PCT/US2013/054287, filed Aug. 9, 2013, and this application claims the benefit of U.S. Provisional Application No. 61/863,519 filed Aug. 8, 2013, both applications are incorporated by reference herein in their entirety.

FIELD

The disclosure generally relates systems and methods to facilitate the handling of oilfield materials in a space efficient manner, and more particularly, but not by way of limitation, mobile apparatus and methods for transferring oilfield materials.

BACKGROUND

To facilitate the recovery of hydrocarbons from oil and gas wells, the subterranean formations surrounding such wells can be hydraulically fractured. Hydraulic fracturing may be used to create cracks in subsurface formations to allow oil and/or gas to move toward the well. The formation is fractured by introducing a specially engineered fluid, sometimes referred to as fracturing fluid or fracturing slurry, at high pressure and high flow rates into the formation through one or more wellbores. The fracturing fluids may be loaded with proppant which are sized particles that may be mixed with the liquids of the fracturing fluid to help form an efficient conduit for production of hydrocarbons from the formation to the wellbore. Proppant may comprise naturally occurring sand grains or gravel, man-made proppants, e.g. fibers or resin coated sand, high-strength ceramic materials, e.g. sintered bauxite, or other suitable materials. The proppant collects heterogeneously or homogeneously inside the fractures to prop open the fractures formed in the formation. Effectively, the proppant creates planes of permeable conduits through which production fluids can flow to the wellbore.

At the well site, proppant and other fracturing fluid components are blended at a low-pressure side of the system. The oilfield materials often are delivered from storage facilities to a blender by pneumatic systems which blow the oilfield materials. Water-based liquid is added and the resulting fracturing fluid is delivered downhole under high pressure. However, handling of the proppant prior to blending tends to create substantial dust as the proppant is moved to the blender via blowers. As a result, dust control devices, e.g. vacuums, are employed in an effort to control the dust. The variety of equipment used in the process also tends to create a large footprint at the well site, and operating the equipment is generally a manually intensive process.

Therefore, there is a need for equipment useful at a well site which minimizes the requisite space while utilized, such need met, at least in part, by the following disclosure.

SUMMARY

In some aspects, the disclosure provides systems and methods which facilitate the handling of oilfield materials in a space efficient manner. In some embodiments, a mobile oilfield material transfer unit is disclosed, which includes a chassis having a first end, a second end, at least one support beam extending between the first end and the second end, and two or more wheels operably coupled with the at least one support beam for movably supporting the at least one support beam. The mobile oilfield material transfer unit further includes an erecting mast assembly having a mast movably connected with the chassis proximate to the second end, and an actuator system coupled with the mast and with the chassis for moving the mast between a horizontal position and a vertical position. The mobile oilfield material transfer unit may further include a first conveyor assembly having a support frame coupled with the mast and moveable between the horizontal position and the vertical position, where the first conveyor assembly includes a first conveyor coupled with the support frame, an inlet, and an upper discharge portion, and the first conveyor adapted to move a volume of oilfield material from the inlet to the upper discharge portion. The mobile oilfield material transfer unit may additionally have a first support beam and a second support beam extending between the first end and the second end and being separated by a gap, and a second conveyor system having including a second conveyor configured to move oilfield material toward the second end of the chassis, the second conveyor system at least partially positioned in the gap. The second conveyor system may also include a third conveyor positioned between the first and second conveyors, and wherein the inlet of the first conveyor is below and proximate to a discharge of the third conveyor of the second conveyor system.

In another aspect of the disclosure, a mobile oilfield material transfer unit includes a chassis having a gooseneck and support base, the support base including a first portion and second portion, and the chassis further comprising a rear axle suspension system coupled with at least two wheels for movably supporting the chassis. The mobile oilfield material transfer unit further includes an erecting mast assembly having a mast movably connected with the chassis proximate to the second portion, and an actuator system coupled with the mast and with the chassis for moving the mast between a horizontal position and a vertical position. At least two vertical conveyor assemblies may be coupled with the erecting mast and moveable between the horizontal position and the vertical position, and at least two horizontal conveyor systems may be coupled with the support frame and engageable with the at least two vertical conveyor assemblies. Each of the at least two horizontal conveyor systems may have a horizontal section with an inlet and an inclinable section with a discharge chute. Also, each of the at least two horizontal conveyor systems may be adapted to move a volume of oilfield material from the inlet to the discharge chute.

In some other aspects, mobile material delivery systems are disclosed which include at least two movable silos, each silo comprising an outer housing and a frame, and at least one vertical conveyor assembly for delivering materials to the at least two movable silos, where the number of the at least one vertical conveyor assemblies is at least one less than the number of the at least two movable silos. In some cases, the mobile material delivery systems have a frame which includes a first portion and a second portion, a base movably connected with the silo frame at an end of the second portion, and wherein the frame supports the outer housing at the first portion. The mobile material delivery systems may, in some cases, also include a mobile support structure. Each of the at least two movable silos may be configured to be transported by a trailer having a mechanism for moving the silo between travel and operational orientations. In some instances, the trailer includes a trailer bed, a flipper mechanism coupled to the trailer bed, a rocker arm coupled to the trailer bed and the flipper mechanism, a first hook plate and a second hook plate attached to the flipper mechanism, where the first hook plate and the second hook plate are laterally opposed to each other on the flipper mechanism and wherein the first hook plate and the second hook plate are oriented at a first non-zero angle with respect to each other. Each of the at least two movable silos of the mobile material delivery systems may include a plurality of support legs, a first pin and a second pin attached to the plurality of support legs, the first pin coupleable to the first hook plate and the second pin coupleable to the second hook plate.

In some other aspects, each of the at least two movable silos of the mobile material delivery system further includes an inner bin with a first interior portion and an outer bin with a second interior portion, where the inner bin is at least partially disposed within the second interior portion of the outer bin. The silos may also have a feed having a first outlet configured to direct one or more materials to the first interior portion of the inner bin and a second outlet configured to direct one or more materials to the second interior portion of the outer bin.

In yet other aspects of mobile material delivery systems where the number of the at least one vertical conveyor assemblies is at least one less than the number of the at least two movable silos, the at least one vertical conveyor assembly includes a bucket elevator and gravity dump hauler, and the at least one vertical conveyor assembly is configured to enable substantially dust-free loading of the at least two movable silos. The mobile material delivery systems may further include a mobile support structure, where the mobile support structure is configured to receive and convey oilfield material to the at least one at least one vertical conveyor assembly. Each of the at least one vertical conveyor assemblies may be movably coupled with a trailer chassis having a mechanism for moving the silo between travel and operational orientations.

In yet another aspect, disclosed are methods which include providing a mobile oilfield material transfer unit to a well site in a stowed orientation, where the mobile oilfield material transfer unit includes at least one vertical conveyor assembly coupled with an erecting mast and moveable between a horizontal position and a vertical position, at least one horizontal conveyor system, at least one auger conveyor, and at least one ramp. The mobile oilfield material transfer unit is then deployed into an operational orientation adjacent at least one silo, such as an array of modular silos, and oilfield material is delivered to the at least one horizontal conveyor system. The oilfield material may then be transferred to at least one silo through the mobile oilfield material transfer unit.

Other aspects include methods where at least one mobile oilfield material transfer unit is provided to a well-site in a stowed orientation, where each of the at least one mobile oilfield material transfer units comprises at least one vertical conveyor assembly moveable between a horizontal position and a vertical position. At least two movable silos are provided to the well-site in a stowed orientation. Then, the at least two movable silos are deployed into an operational orientation, and the mobile oilfield material transfer unit(s) are deployed into an operational orientation adjacent the at least two movable silos. Oilfield material may be delivered to the vertical conveyor system(s), and transferred to the at least two movable silos through the at least one vertical conveyor systems. The number of vertical conveyor assemblies is at least one less than the number of movable silos.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the disclosure. However, it will be understood by those of ordinary skill in the art that the system and/or methodology may be practiced without these details and that numerous variations or modifications from the described embodiments may be possible.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
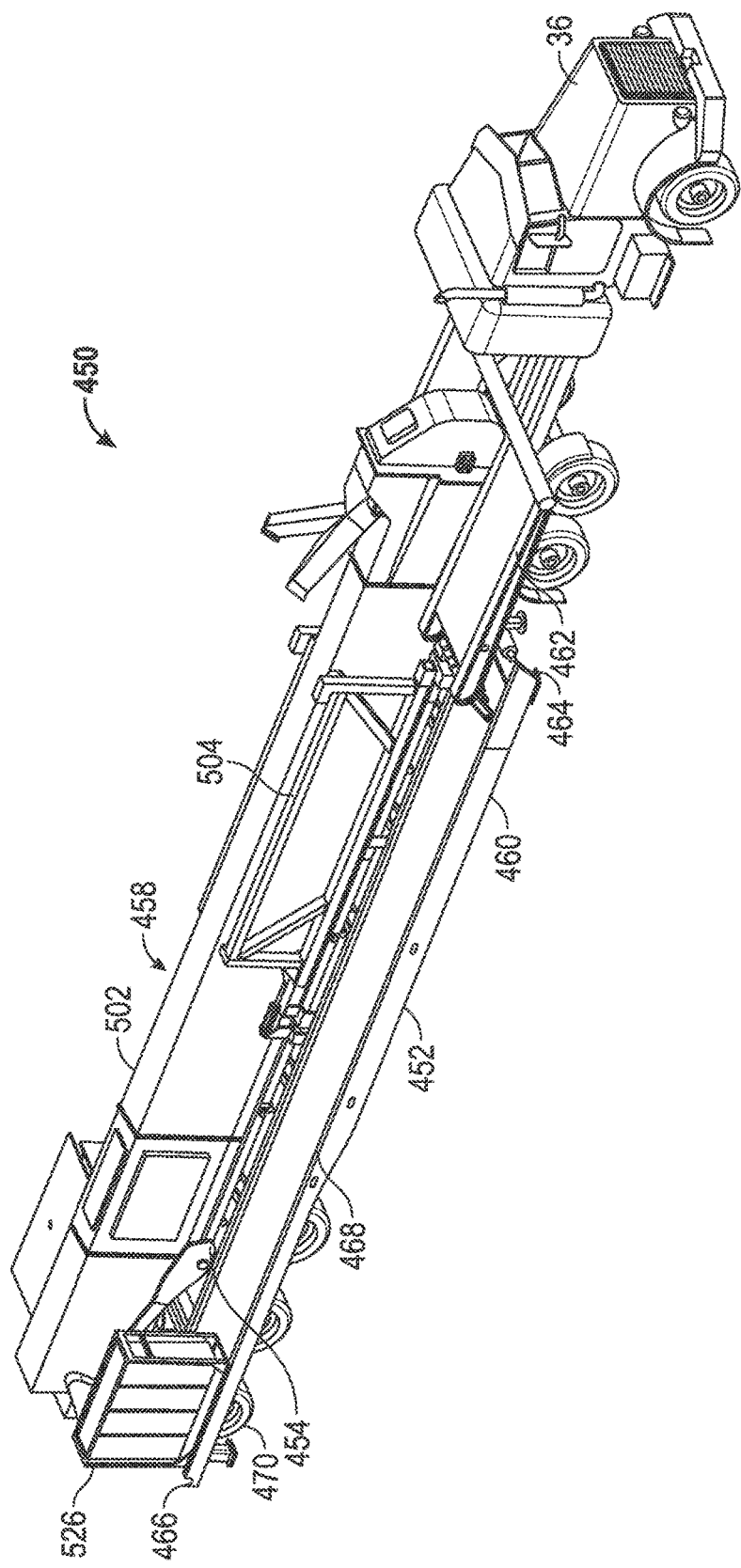
FIG. 1 is a perspective view of an example of a mobile oilfield material transfer unit according to an embodiment of the disclosure, with a first conveyor assembly shown in a horizontal position.
Figure 2:
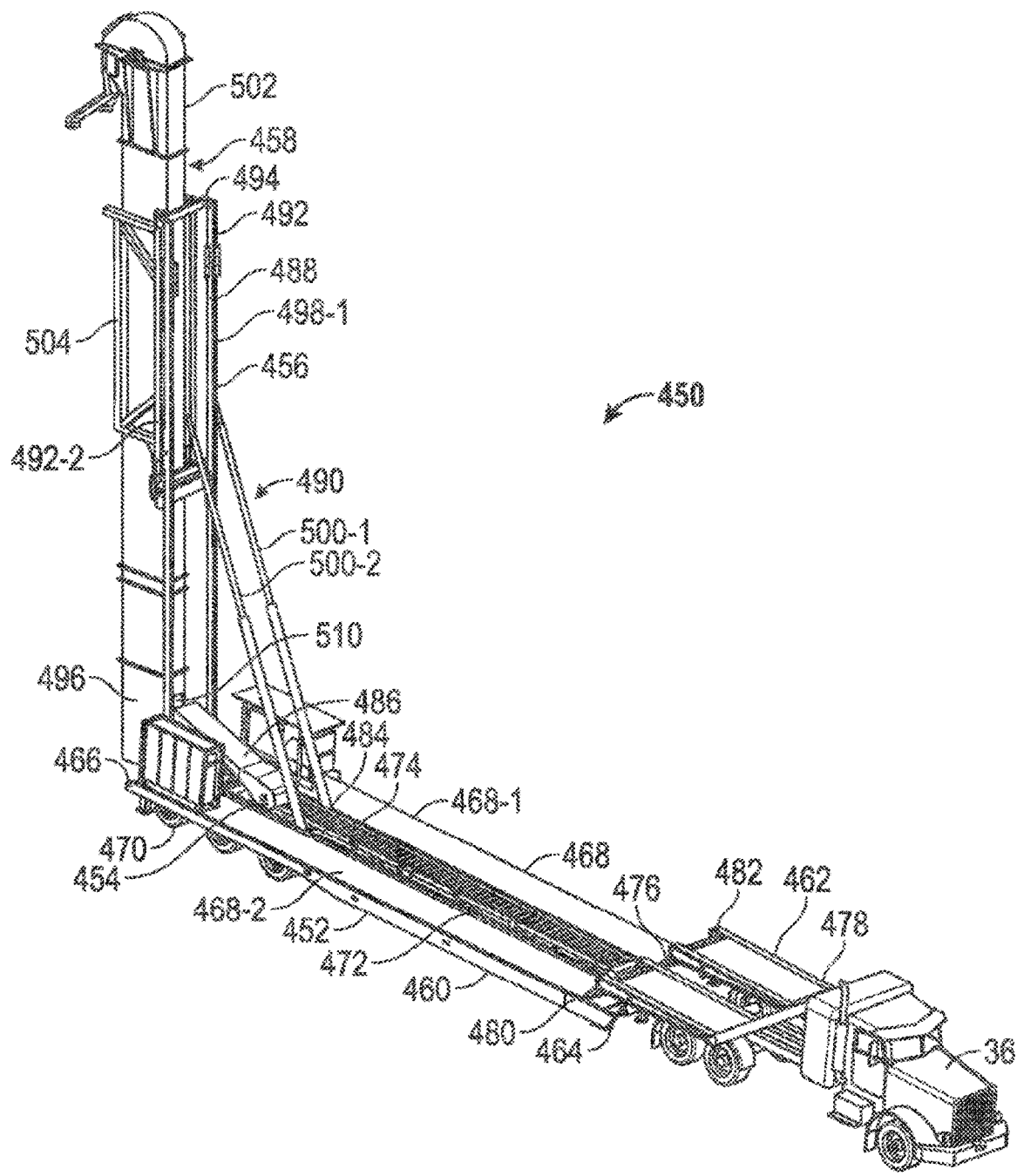
FIG. 2 is a perspective view of the mobile oilfield material transfer unit of FIG. 1 shown with the first conveyor assembly shown in a vertical position.

Referring generally to FIGS. 1-2, illustrated therein is one embodiment of a mobile oilfield material transfer unit 450 constructed in accordance with the disclosure. The mobile oilfield material transfer unit 450 may include a chassis 452, a horizontal conveyor system 454 that may be referred to herein as a "second conveyor system 454", an erecting mast assembly 456, and a first conveyor assembly 458, that may also be referred to herein as a vertical conveyor system.

The chassis 452 includes a support base 460 and a gooseneck portion 462. The chassis 452 may be configured to support the first conveyor assembly 458 and to be pulled by a truck 36 to transport the first conveyor assembly 458 to any desired location such as a well site. The chassis 452 is coupled to the erecting mast assembly 456 and may further be configured to erect the first conveyor assembly 458 to an upright or vertical operational position for conveying oilfield material into a silo (which may be a modular silo), as discussed in more detail with reference to FIG. 5. The chassis 452 may cooperate with the erecting mast assembly 456 to move the first conveyor assembly 458 from a horizontal or transport position on the chassis 452 to an upright or vertical operational position. In some embodiments the chassis 452 may also be configured to be docked or otherwise aligned with a modular silo as will be described below. In yet some further aspects, chassis 452 may be adapted to dock an extended base of a system support frame.

The chassis 452 is provided with a support base 460 having a first end 464 (e.g., a front end) and a second end 466 (e.g., a rear end). The chassis 452 may also be provided with a support beam 468 extending between the first end 464 and the second end 466 of the support base 460, and a plurality of wheels 470 located at least partially underneath the support beam 468 (e.g., proximate to the second end 466) and operably connected to the support beam 468. The wheels 470 may be connected to one or more axles, and may include collapsible suspensions in some embodiments of the disclosure, such that the support base 460 may be positioned onto the ground when the suspension of the wheels 470 is collapsed.

In the embodiment shown in FIGS. 1-2, the chassis 452 is provided with two support beams, e.g., 468-1 and 468-2, which are separated from one another by a gap 472 and may be connected together to collectively form a support base 460 via one or more transverse support members 474 (FIG. 2). The gap 472 extends longitudinally along the support base 460 between the first end 464 and the second end 466. The support beams 468-1 and 468-2 may be implemented as a steel beam, channel, I-beam, H-beam, wide flange, universal beam, rolled steel joist, or any other structure. In some embodiments of the disclosure a plurality of transverse support members 474 may be spaced a distance apart from one another between the first end 464 and the second end 466 of the support base 460, while extending between the support beams 468-1 and 468-2.

Figure 6:
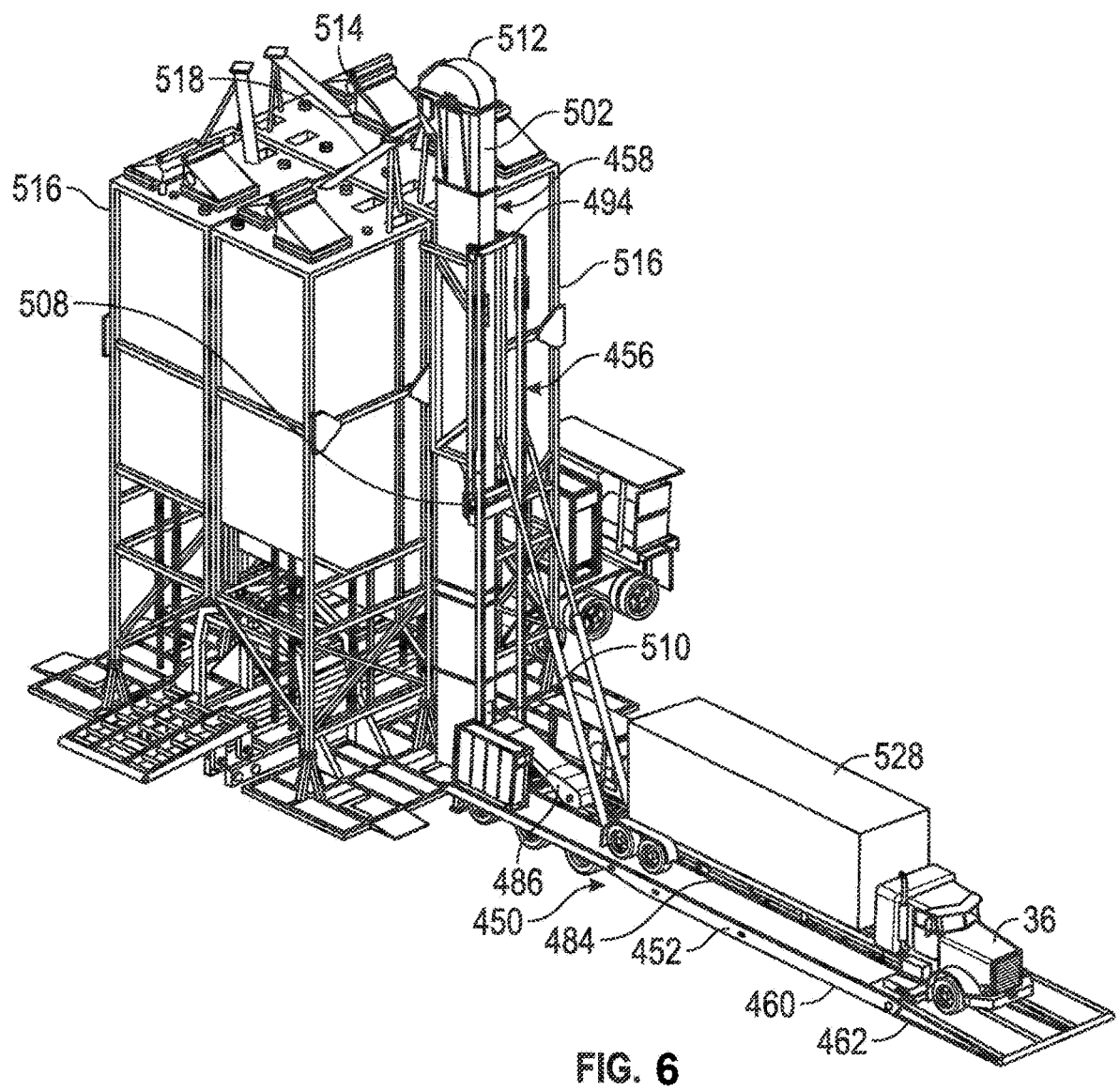
FIG. 6 is a perspective view of the mobile oilfield material transfer unit of FIG. 5 shown with an oilfield material delivery trailer positioned thereon, according to an embodiment of the disclosure.

The gooseneck portion 462 extends from the first end 464 of support base 460 and is configured to connect the chassis 452 to a truck, such as truck 36, via a suitable trailer hitch, for example. Once the truck 36 has been disconnected from the gooseneck portion 462, the gooseneck portion 462 may be manipulated to lie on the ground and be generally co-planar with the support base 460 as shown in FIG. 6. In this configuration, in some cases the gooseneck portion 462 may form a ramp to allow an oilfield material delivery truck or trailer to be driven over or backed onto the support base 460. For example, the gooseneck portion 462 may be provided with a first section 476 and a second section 478. The first section 476 may extend from the first end 464 of the support base 460. The first section 476 has a first end 480 and a second end 482. The first end 480 of the first section 476 is movably connected to the support base 460, such as by the use of a set of hinges, voids and pins or other types of connectors which may be locked at more than one position. The second section 478 is movably connected to the second end 482 of the first section 476. For example, the first section 476 may be a four bar linkage which can be locked in an elevated position to form the gooseneck portion 462, or a lowered position to form a ramp. Any desired trailer hitch such as a gooseneck hitch having a structure known in the art as a "kingpin", for example, may be implemented to connect the gooseneck portion 462 to the truck 36 as will be appreciated by persons of ordinary skill in the art having the benefit of the disclosure.

The second conveyor system 454 can be implemented as any suitable conveyor-belt type transloader or auger, and may be associated with the support base 460 so that the second conveyor system 454 is positioned at least partially in the gap 472 between the support beams 468-1 and 468-2. In another embodiment, the second conveyor system 454 may be pivotably connected to the chassis 452 so as to move oilfield material towards the second end 466 of the chassis 452. In one embodiment, at least a portion of the second conveyor system 454 extends along a centerline of the support base 460 as shown in FIGS. 1-2. The second conveyor system 454 has a second conveyor 484 and a third conveyor 486. The second conveyor 484 may be recessed in the gap 472 and positioned substantially horizontally such that a top surface of the second conveyor 484 is positioned level with or below a top surface of the support beams 468-1 and 468-2, and is configured to allow an oilfield material transport truck or trailer positioned on the support base 460 to discharge, dump, or otherwise deposit a volume of oilfield material onto the second conveyor 484 and to transport the volume of oilfield material from the first end 464 toward the second end 466 of the support base 460. In some embodiments, the second conveyor 484 may be positioned at a centerline of the support base 460. The third conveyor 486 is positioned between the second conveyor 484 and the second end 466 of the chassis 452 and is configured to receive a volume of oilfield material from the second conveyor 484 and to transport the oilfield material towards the second end 466. As will be appreciated by persons of ordinary skill in the art, the second conveyor system 454 may include an auger, a conveyor belt with a smooth surface, or with cleated features for oilfield material transfer (e.g., in the third conveyor 486). Further, in some embodiments the second conveyor 484 may be open, and the third conveyor 486 may be enclosed, as will be appreciated by a person of ordinary skill in the art having the benefit of the disclosure. The third conveyor 486 may positioned, in some aspects, at an upwardly inclined (non-zero, positive angle) with respect to the second conveyor 484.

Figure 5:
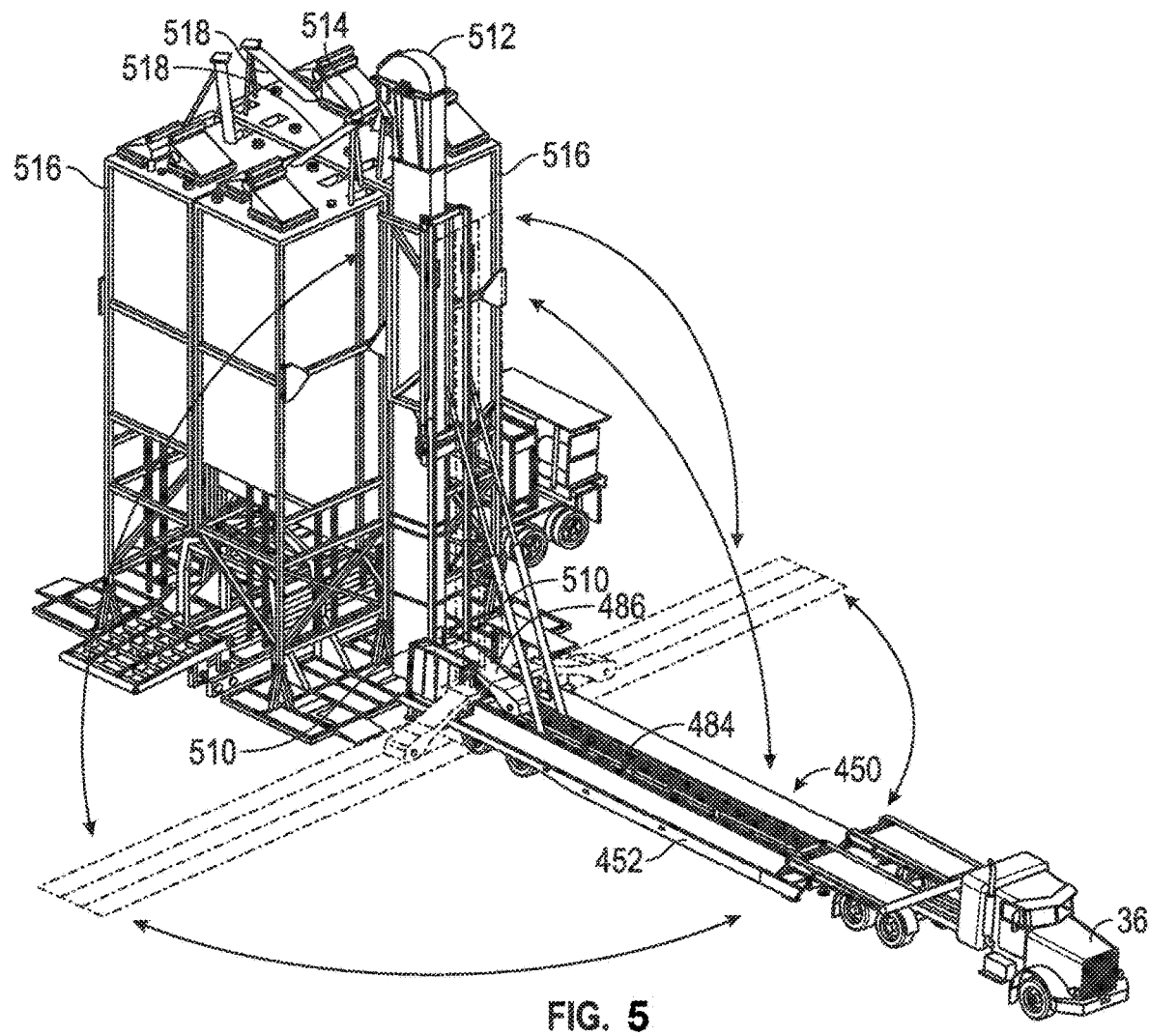
FIG. 5 is a perspective view of a mobile oilfield material transfer unit shown coupled with a modular silo according to an embodiment of the disclosure.

In some embodiments of the disclosure, second conveyor system 454 may be pivotably connected with the support base 460 and/or the chassis 452 such that the second conveyor system 454 can be pivoted laterally from the support base 460 at any desired angle as shown in FIG. 5.

The erecting mast assembly 456 may include a mast 488 supported by the chassis 452, and an actuator system 490 engaging the mast 488 and the chassis 452. The erecting mast assembly 456 is configured to lay flat onto the support base 460 (e.g., onto the support beams 468-1 and 468-2) when the chassis 452 is transported, and to clear the second conveyor system 454 when the erecting mast assembly 456 is deployed to the upright or vertical operational position. The range of motion of the erecting mast assembly 456 may extend from horizontal to slightly past vertical (e.g., more than a 90 degree range of motion) when deployed to account for angular misalignment, due to ground height differences, for example. The erecting mast assembly 456 may be formed from steel tubing, beam, channel, I-beam, H-beam, wide flange, universal beam, rolled steel joist, or any other suitable material and shape.

The mast 488 may be supported by the support beams 468-1 and 468-2 of the chassis 452 proximate to the second end 466 of the chassis 452. The mast 488 is configured to support the first conveyor assembly 458 and to be moved between a horizontal position (FIG. 1) and a vertical position (FIG. 2) by the actuator system 490 to raise the first conveyor assembly 458 to the vertical position and to associate the first conveyor assembly 458 with a modular silo as will be described with reference to FIG. 5 below.

The mast 488 may be provided with a frame 492 including a first end 494, a second end 496, a first support beam 498-1 extending between the first end 494 and the second end 496, and a second support beam 498-2 extending between the first end 494 and the second end 496. The first and second support beams 498-1 and 498-2 may be spaced apart in a parallel orientation and configured to jointly support the first conveyor assembly 458 as will be described below.

The actuator system 490 engages the mast 488 and at least one of the support beams 468-1 and 486-2 of the chassis 452 to move the mast 488 in an arc-shaped path for moving the first conveyor assembly 458 between the horizontal and vertical positions. As shown in FIGS. 1 and 2, the actuator system 490 may include a plurality of actuators 500-1 and 500-2 working in concert to move the mast 488 from the lateral position to the vertical position. However, it will be understood that the actuator system 490 may be implemented as a single actuator 500 or any number of actuators 500. The actuator(s) 500 may be implemented as hydraulic actuators, pneumatic actuators, electrical actuators, mechanical actuators, or any suitable mechanism capable of moving the mast 488 into the vertical position.

The first conveyor assembly 458 may be implemented as an enclosed vertical bucket elevator or an auger (e.g., not using airflow to carry the oilfield material), and may include a first conveyor 502 and a support frame 504 which is movably connected to the mast 488 of the erecting mast assembly 456 so that the first conveyor 502 is movable between a horizontal position where the first conveyor 502 lies flat onto the support base 460 during transport, and a vertical position where the first conveyor 502 is oriented vertically for transporting a volume or oilfield material into one or more modular silos. In some embodiments, the first conveyor 502 may be implemented and may function similarly to the vertical conveyor 458 described above.

Figure 3:
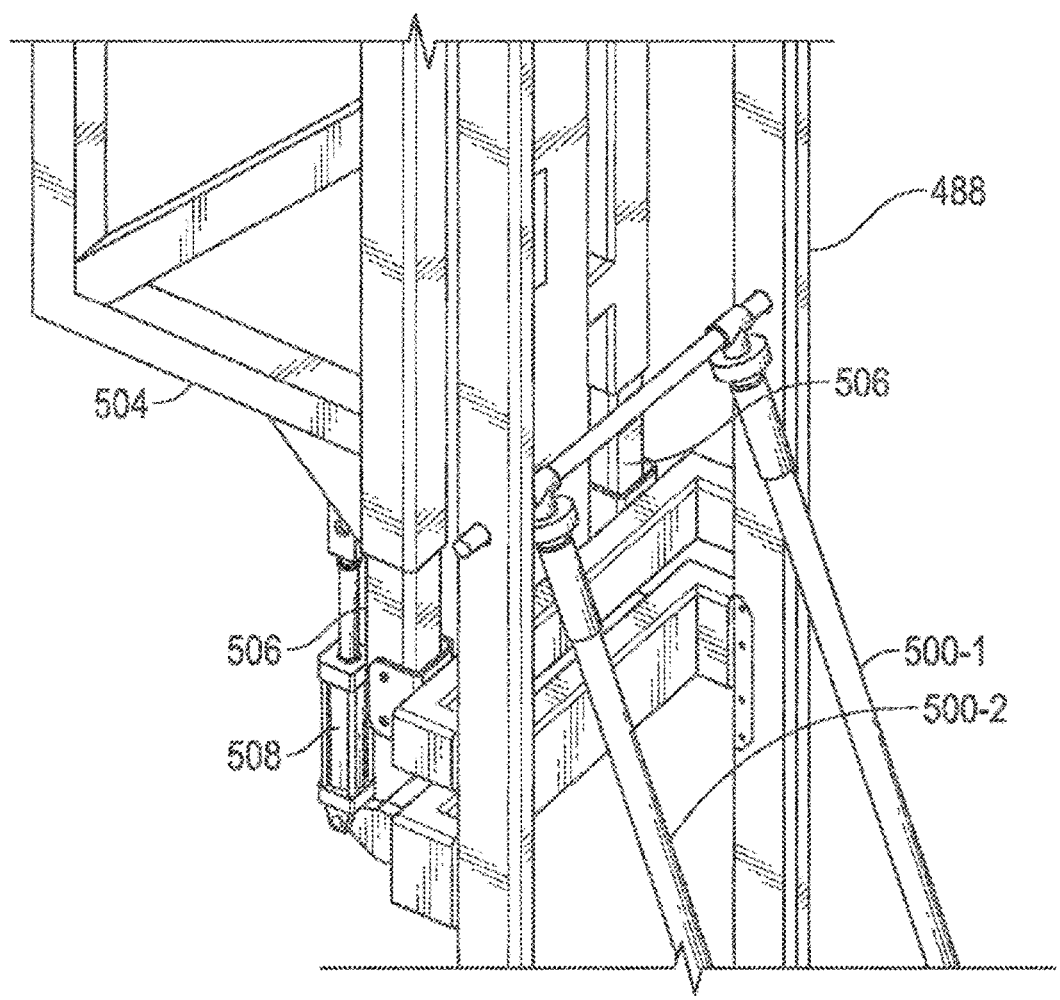
FIG. 3 is a partial perspective view of an example of a support frame of a first conveyor assembly according to an embodiment of the disclosure.

As shown in FIG. 3, the support frame 504 may be movably connected to the mast 488 via one or more mechanical linkages 506 attached to the mast 488 and one or more actuators 508 configured to slide, or otherwise move the support frame 504 relative to the first end 494 of the mast 488 within a predetermined range. In some embodiments the actuators 508 may be implemented as hydraulic or pneumatic actuators. It is to be understood that the mechanical linkages 506 may be implemented in a variety of manners, such as rails (as shown in FIG. 3) hydraulic or pneumatic arms, gears, worm gear jacks, cables, or combinations thereof.

Figure 4:
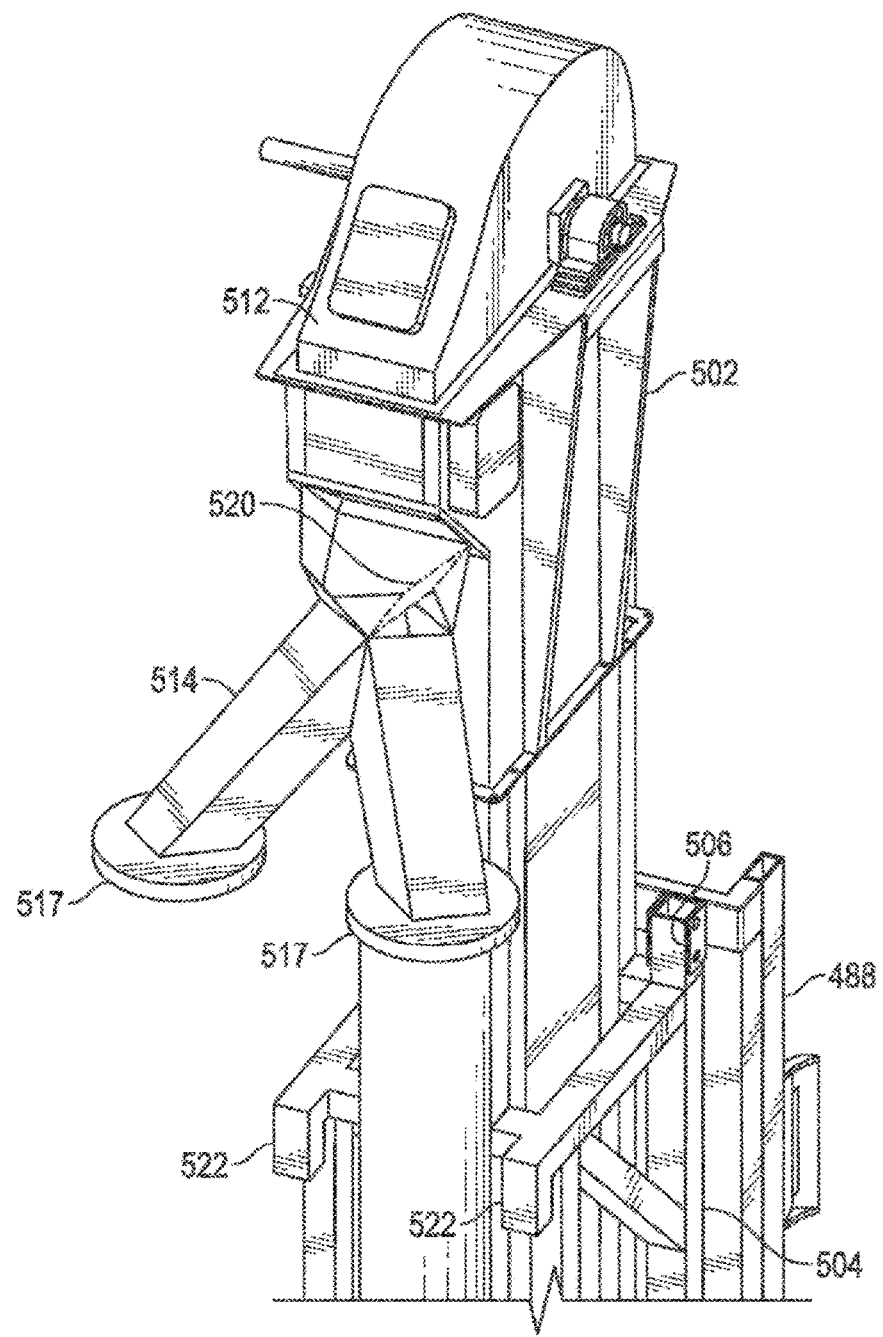
FIG. 4 is a perspective view of an example of a discharge chute of a first conveyor assembly according to an embodiment of the disclosure.

Referring now to FIGS. 4-5, the first conveyor 502 may include an inlet 510 and an upper discharge portion 512. The inlet 510 may be positioned proximate and/or below the third conveyor 486 of the second conveyor system 454 such that a volume of oilfield material transported via the third conveyor 486 of the second conveyor system 454 enters the first conveyor 502 via the inlet 510.

The upper discharge portion 512 may include a discharge chute 514 which may be a dual-discharge chute configured to fill two or more modular silos 516 simultaneously, such as by having two or more outlets 517 operably coupled with two or more receiving chutes 518 of the modular silos 516, for example. In some embodiments, the discharge chute 514 may include a built-in diverter valve 520 (e.g., a three-position diverter valve) to allow the discharge chute 514 to fill one, two, or more than two modular silos 516 as will be appreciated by persons of ordinary skill in the art. The discharge chute 514 can interface, or otherwise be coupled with the receiving chutes 518 of the modular silos 516 in any desired manner protected from rain and/or moisture, for example, by including one or more rain-covers or shields.

As shown in FIG. 4, the support frame 504 may include one or more optional silo-engaging members 522, which may be implemented as hooks, L-shaped protrusions, flanges, or combinations thereof, for example. The silo-engaging members 522 may be configured to engage corresponding frame-attachment members (not shown) formed in the modular silo(s) 516, such that the support frame 504 and the first conveyor 502 may be securely attached, or otherwise associated with the modular silo(s) 516. As will be appreciated by persons of ordinary skill in the art, the silo-engaging members 522 and/or the frame-attachment members may be omitted in some embodiments of the disclosure.

Referring again to FIG. 1, in some embodiments an optional power supply system 526 may be implemented with the mobile oilfield material transfer unit 450, and may be configured to power the actuator system 490, the first conveyor 502, and the actuators 508. However, in some embodiments the power supply system 526 may be omitted, and the actuator system 490, the first conveyor assembly 458, and the actuators 508 may be powered by any desired power source, such as a power source associated with the modular silos 516, a separate generator, an electrical line connected to a grid or to a local power source, and combinations thereof. Some examples of power source types include, but are not limited to, electric, natural gas, liquid fuel, and the like. In some embodiments where the power supply system 526 is provided with the mobile oilfield material transfer unit 450, the power supply system 526 is desirably sized and positioned onto the support base 460 so as to not interfere with the operation and movement of the erecting mast assembly 456 and the second conveyor system 454.

Referring now to FIG. 6, in operation a mobile oilfield material transfer unit 450 may function as follows: the truck 36 backs up the chassis 452 proximate to one or more modular silo 516 (e.g., a cooperating unit of two or more modular silos 516). When the truck 36 has been disconnected from chassis 452, the gooseneck portion 462 may be manipulated to lie on the ground and be generally co-planar with the support base 460 to form a ramp to allow an oilfield material transport trailer 528 to be driven over or backed onto the support base 460. The erecting mast assembly 456 is raised to the vertical position so as to raise the first conveyor assembly 458 to the vertical position as well. The actuators 508 may be operated to raise the first conveyor 502 to the upper limit of the predetermined range of movement of the actuators 508, by moving the support frame 504 relative to the first end 494 of the mast 488 (e.g., along the mechanical linkage 506). The position of the chassis 452 relative to the modular silo(s) 516 may be adjusted as needed (e.g., in three dimensions, such as by moving the chassis 452, by docking or otherwise aligning the second end 466 of the chassis 452 with the modular silo(s) 516, and/or by collapsing a suspension of the chassis 452 to position the discharge chute 514 to engage with the receiving chutes 518. The actuators 508 may be operated to lower the first conveyor 502 over the modular silo(s) 516 such that the discharge chute 514 engages the receiving chutes 518. Optionally, lowering the first conveyor 502 may also cause the silo-engaging members 522 to engage with the corresponding frame-attachment members, such that the support frame 504 of the first conveyor assembly 458 is securely attached, or otherwise associated with the modular silo(s) 516 causing the discharge chutes 514 to be aligned with the receiving chutes 518 of the modular silo(s).

The oilfield material transport trailer 528 may be backed over the chassis 452, such that discharge openings (not shown) of the oilfield material transport trailer 528 are positioned over and vertically aligned with the second conveyor 484 of the second conveyor system 454. As a volume of oilfield material is dumped, discharged, or otherwise deposited (e.g., under gravity) on the second conveyor system 454, the oilfield material is moved by the second conveyor 484 towards the third conveyor 486. The third conveyor 486 is optional in that the second conveyor 484 may convey the oilfield material directly to the first conveyor 502. The third conveyor 486 continues moving the volume of oilfield material towards the second end 466 of the chassis 452. Once the volume of oilfield material reaches the first conveyor 502, the oilfield material enters the inlet 510 of the first conveyor 502. The volume of oilfield material is carried upward by the first conveyor 502 and is deposited into the modular silos 516 via the discharge chute 514 and the receiving chutes 518.

In some embodiments of the disclosure, second conveyor system 454 may be pivoted laterally from the support base 460 at any suitable angle, and the oilfield material transport trailer 528 may be positioned over the second conveyor system 454 without being backed over the chassis 452 as shown in FIG. 5, as will be appreciated by persons of ordinary skill in the art having the benefit of the disclosure.

Figure 7:
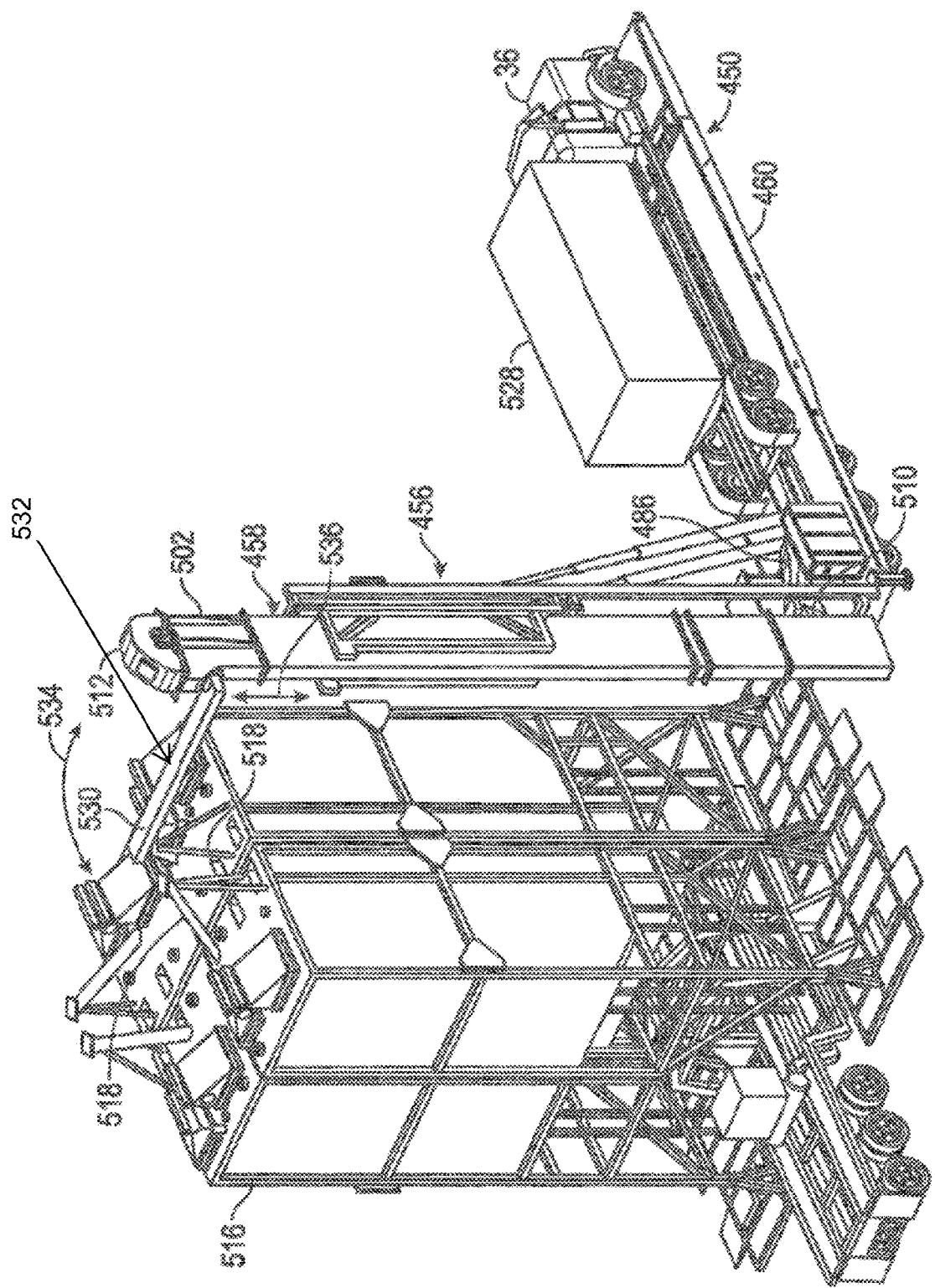
FIG. 7 is a perspective view of a mobile oilfield material transfer unit shown coupled with a modular silo and an oilfield material delivery trailer positioned thereon, according to an embodiment of the disclosure.

Referring now to FIG. 7, in another embodiment, the first conveyor system 454 includes a pivoting conveyor assembly 530 rather than the discharge chute 514. The pivoting conveyor assembly 530 includes a conveyor 532 that may be attached to a housing and/or support frame extending around the first conveyor 502 with a horizontal adjustment assembly and a vertical adjustment assembly. The horizontal adjustment assembly may include a mechanical linkage with one pivot connection or multiple pivot connections working in concert to provide a range of motion of the conveyor 532 in a horizontal path that may be approximately within a range from about 0 degrees to about 180 degrees as shown by an arrow 534. The conveyor assembly 530 may also include a vertical adjustment assembly (not shown) including a mechanical linkage to provide a range of motion of the conveyor 532 in a horizontal path that may be within a range from about 0 degrees to about 120 degrees as shown by an arrow 536. The horizontal and vertical adjustment assemblies may include one or more actuators to effect controlled motion in the horizontal and vertical paths discussed above.

The horizontal and vertical adjustment assemblies provides movement between a stowed position where the conveyor 532 extends substantially parallel to the first conveyor 502, and an extended position where the conveyor 532 extends laterally away from the first conveyor 502. The conveyor 532 may be implemented as an auger, or an enclosed two-way conveyor belt in some embodiments of the disclosure, and may be pivoted by one or more actuators (not shown). The conveyor 532 may function similarly to the discharge chute 514, and may be coupled with one or more receiving chutes 518 of the modular silo(s) 516 similarly to the discharge chute 514. For example, the conveyor 532 may be coupled with one or more of the receiving chutes 518 in a manner protecting the receiving chutes 518 from rain or moisture, such as via one or more rain covers or shields, for example. As will be appreciated by persons of ordinary skill in the art, the pivoting conveyor assembly 530 allows the chassis 452 to be positioned at any suitable angle, orientation, or position relative to the modular silo(s) 516, such as parallel, angled, or perpendicular, for example. Further, when the pivoting conveyor assembly 530 is implemented, the support frame 504 may or may not be attached to the silo(s) via the silo-engaging members 522.

Figure 8:
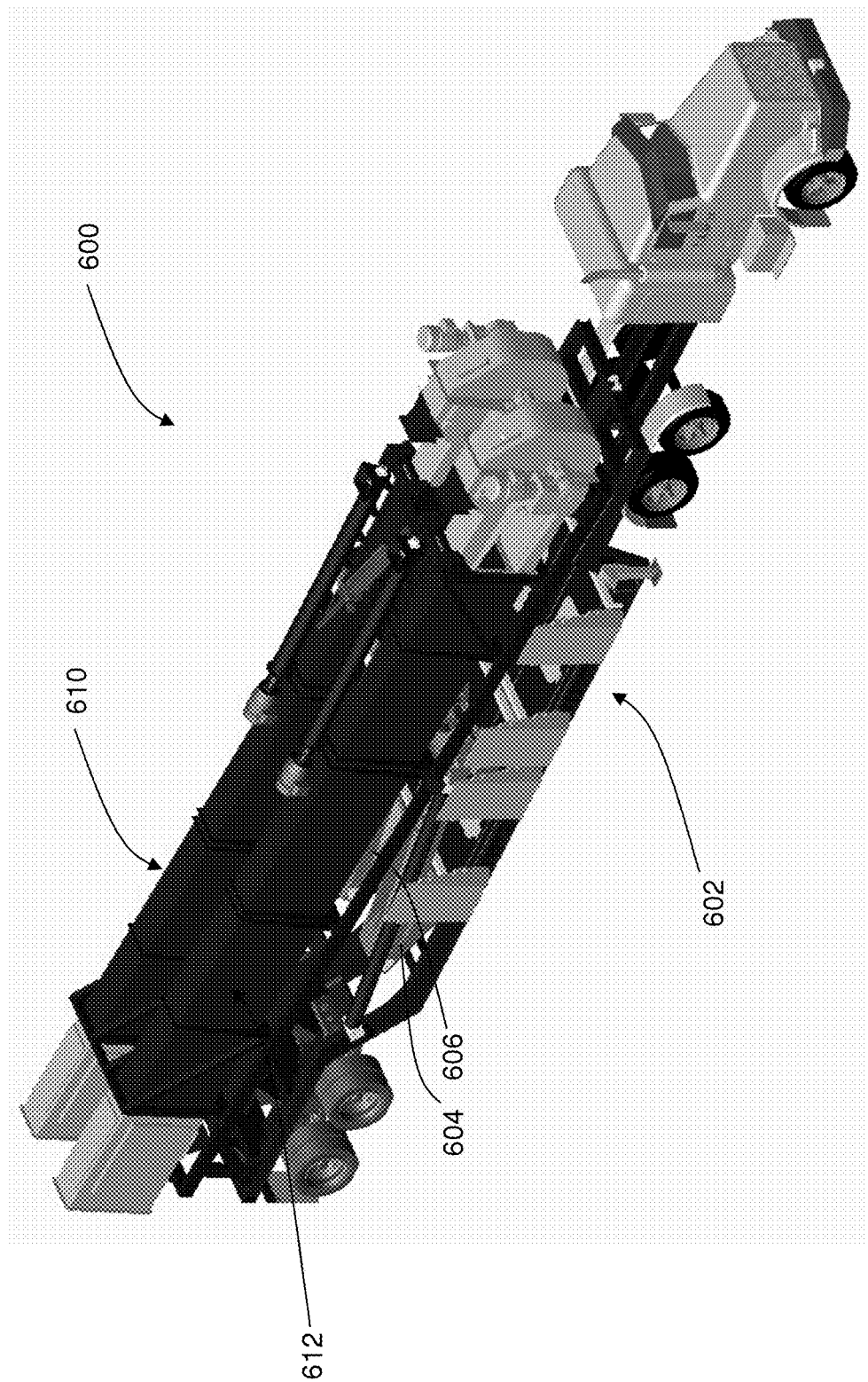
FIG. 8 is a perspective view of a mobile oilfield material transfer unit shown in a stowed orientation and coupled with a tractor, according to an embodiment of the disclosure.
Figure 9:
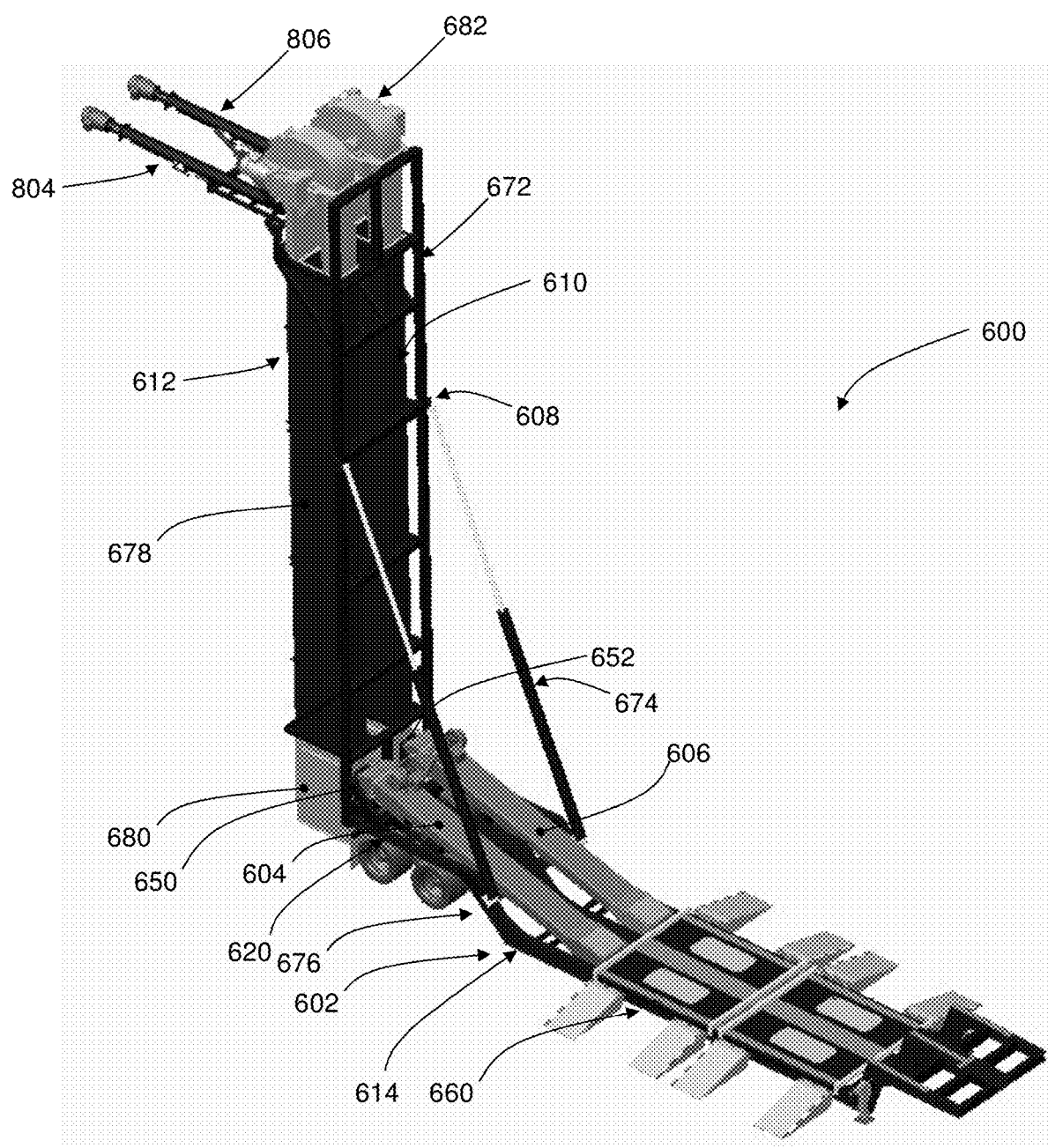
FIG. 9 is a perspective view of an embodiment of a mobile oilfield material transfer unit shown deployed in an operational orientation, according to an embodiment of the disclosure.
Figure 10:
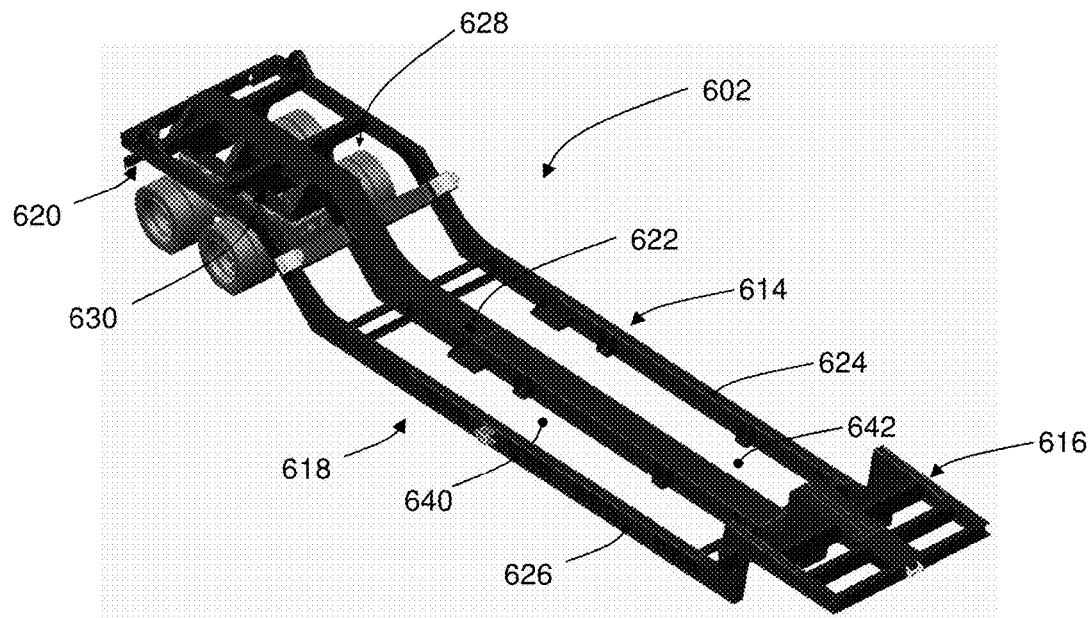
FIG. 10 is a perspective view of a chassis, according to an embodiment of the disclosure.

In accordance with some further embodiments of the disclosure, FIGS. 8 and 9 illustrate mobile oilfield material transfer unit 600. The mobile oilfield material transfer unit 600 may generally include a chassis 602, two horizontal conveyor systems 604, 606, an erecting mast assembly 608, an access deck 660, and two vertical conveyor assemblies 610, 612. The chassis 602 may be configured to support the two vertical conveyor assemblies 610, 612, and to be pulled by a truck to transport the vertical conveyor assemblies 610, 612 to any desired location, such as a well site. Now referring to FIG. 10, which depicts chassis 602 in greater detail. The chassis 602 includes a support base 614 and a gooseneck portion 616. Support base 614 includes a first portion 618 and second portion 620. Chassis 602 further includes a central box beam structure 622 and outer beam rails 624, 626 which extend across first portion 618, second portion 620, and may further extend to gooseneck portion 616. The outer beam rails 624, 626 may be implemented as a steel beam, channel, I-beam, H-beam, wide flange, universal beam, rolled steel joist, or any other suitable structure. In some embodiments, second portion 620 may include a collapsible rear axle suspension system 628. In some aspects collapsible rear axle suspension system 628 includes a tandem air-bag suspension to lower first portion 618 to rest firmly on the ground when in operation. Further, chassis 602 may be a lowboy trailer design with low ground clearance to further facilitate lowering first portion 618 onto the ground. In some cases a rear outrigger structure 630 may extend from a lower side of central box beam structure 622, and located at second portion 620, to support the collapsible rear axle suspension system 628.

Figure 11:
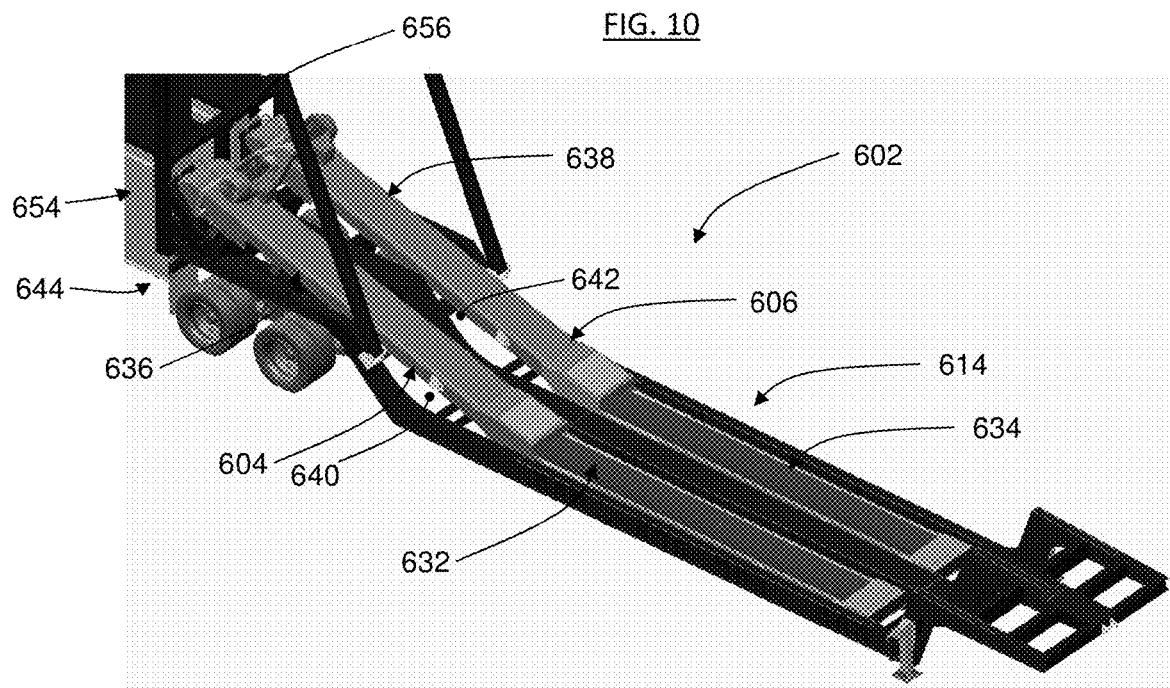
FIG. 11 is a perspective view of a chassis with horizontal conveyors, according to an embodiment of the disclosure.
Figure 12:
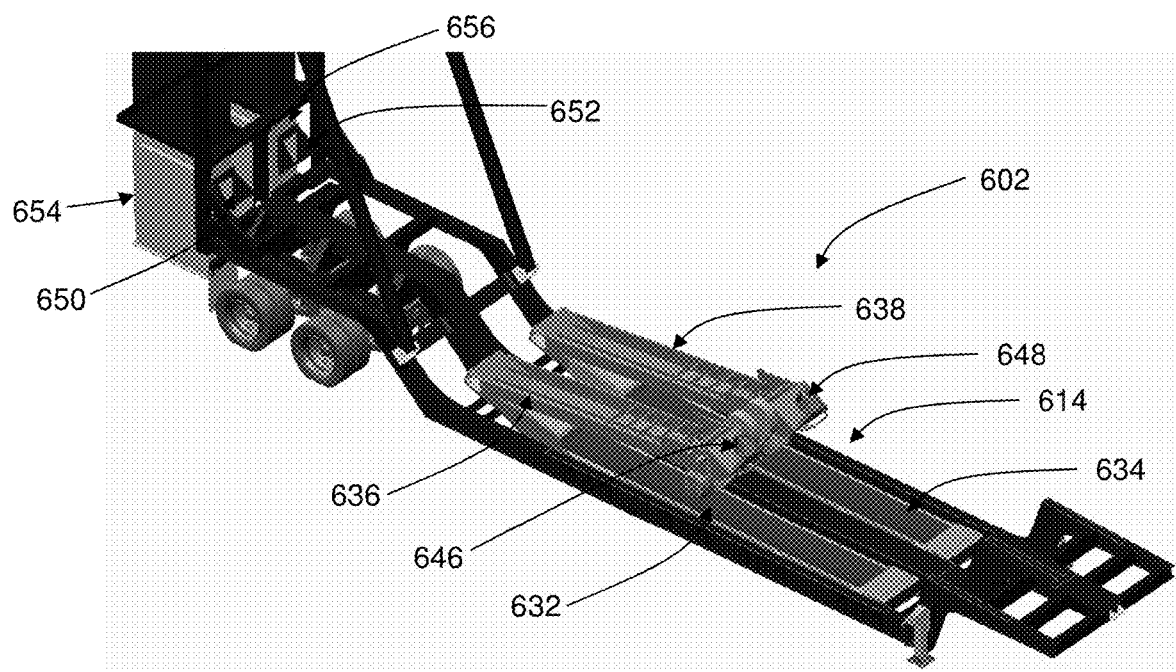
FIG. 12 is a perspective view of a chassis with horizontal conveyors in a stowed orientation, according to an embodiment of the disclosure.

Now referencing FIGS. 11 and 12, which depicts the two horizontal conveyor systems 604, 606 disposed upon support base 614 of chassis 602. In FIG. 11, horizontal conveyor systems 604, 606 are depicted in an operational orientation. Each of horizontal conveyor systems 604, 606 include a horizontal section 632, 634, and inclinable section 636, 638. Conveyor systems 604, 606 can be implemented as any suitable conveyor-belt type transloader or auger, and may be associated with the support base 614 so that the conveyor systems 604, 606 are positioned at least partially in gaps 640, 642 between central box beam structure 622 and outer beam rails 624, 626. Conveyor systems 604, 606 are connected to the chassis 602 and may move oilfield material from horizontal sections 632, 634 towards inclinable section 636, 638, and discharge the material at or near end 644 of chassis 602. In some instances, horizontal sections 632, 634 may be recessed in gaps 640, 642 and positioned substantially horizontally such that a top surface is positioned level with or below a top surface of central box beam structure 622 and outer beam rails 624, 626, and are configured to allow an oilfield material transport truck or trailer positioned on the support base 614 to discharge, dump, or otherwise deposit a volume of oilfield material onto conveyor systems 604, 606 at horizontal sections 632, 634. The volume of oilfield material may then transport from the horizontal sections 632, 634 toward inclinable sections 636, 638. As will be appreciated by persons of ordinary skill in the art, the conveyor systems 604, 606 may include an auger, a conveyor belt with a smooth surface, or with cleated features for oilfield material transfer, or combinations thereof. Further, in some embodiments the horizontal sections 632, 634 may be open, and the inclinable sections 636, 638 enclosed, as will be appreciated by a person of ordinary skill in the art having the benefit of the disclosure. The inclinable sections 636, 638 may positioned at an upwardly inclined (non-zero, positive angle) with respect to the horizontal sections 632, 634.

Referring now to FIG. 12, which depicts horizontal conveyor systems 604, 606 in stowed orientation. Inclinable sections 636, 638 of conveyor systems 604, 606 are pivotably connected with horizontal sections 632, 634, and may be folded during stowing, as shown. In a stowed position, the chassis 602 may be transported to any desired location. As further shown in FIG. 12, inclinable sections 636, 638 include material discharge chutes 646, 648 at a distal end, which may engage bucket elevator located on mobile silos 654, 656 while in an operational orientation. In an operation position, such as depicted in FIG. 11, oilfield material may transport from the horizontal sections 632, 634 into inclinable sections 636, 638, and then be discharged into inlet hoppers 650, 652 through material discharge chutes 646, 648.

Figure 13:
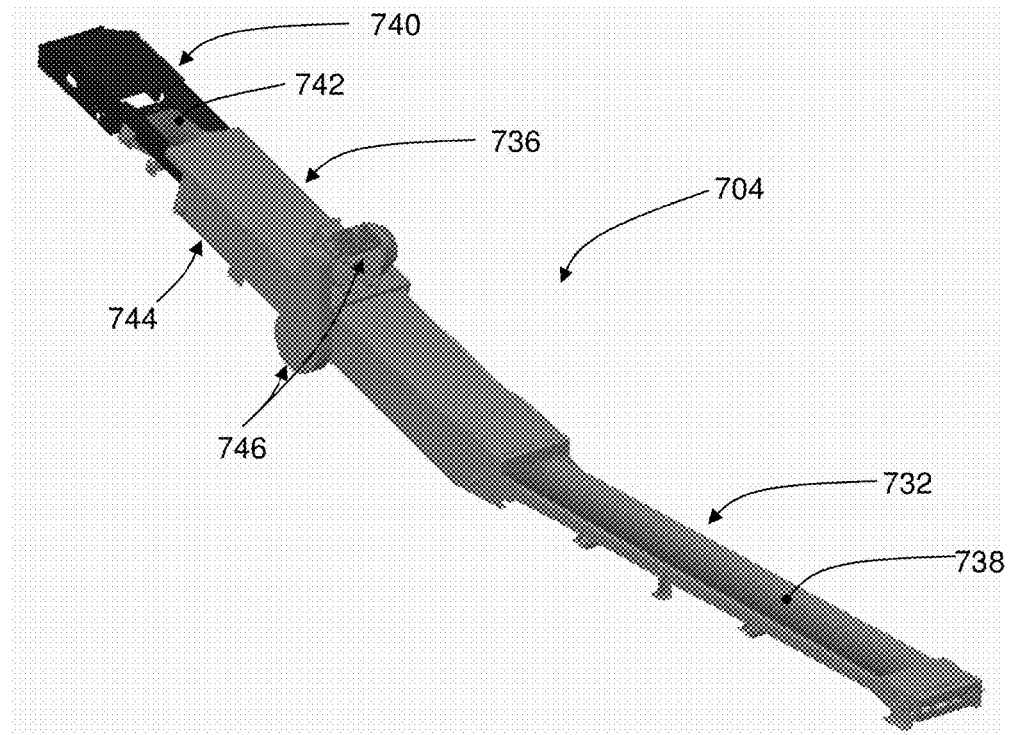
FIG. 13 is a perspective view of a horizontal conveyor system with a telescoping neck, according to an embodiment of the disclosure.
Figure 14:
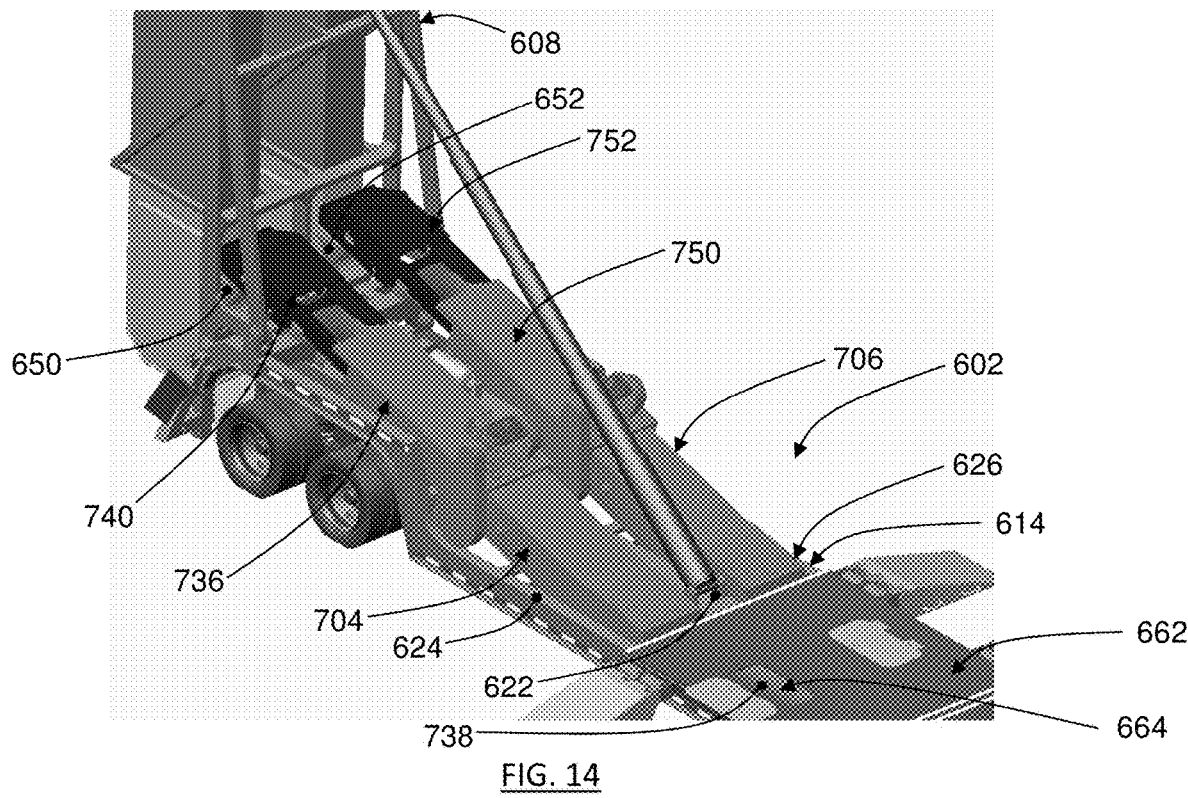
FIG. 14 is a perspective view of a horizontal conveyor system with a telescoping neck disposed upon a support base of a chassis, according to an embodiment of the disclosure.

FIG. 13 illustrates another horizontal conveyor system 704 useful in some embodiments of the disclosure. Horizontal conveyor system 704 includes a horizontal section 732 and inclinable section 736. Horizontal section 732 includes a belt 738, or any other suitable mechanism, disposed therein, for transferring oilfield material. The inclinable section 736 further includes a telescoping neck 740, and which includes belt 742, or any other suitable mechanism, disposed therein. Belt 742 may collapse when telescoping neck 740 is retracted into housing 744, and straighten under tension when the neck 740 is fully extended. Horizontal conveyor system 704 may further include motor/drive-belt assembly 746 for driving belts 738 and 742. FIG. 14 depicts horizontal conveyor systems 704, 706 disposed upon support base 614 of chassis 602, in an operational orientation. Telescoping necks 740, 752 of conveyor systems 704, 706 are fully extended to engage bucket elevator inlets 650, 652 to enable transferring oilfield materials to bucket elevator inlets 650, 652 when the mast assembly 608 is in a raised operational orientation. As further depicted in FIG. 14, conveyor systems 704, 706 are disposed with the support base 614 in such way that the conveyor systems 704, 706 are recessed in gaps formed between central box beam structure 622 and outer beam rails 624, 626. Conveyor systems 704, 706 may move oilfield material from respective horizontal sections (disposed beneath surface 662) by belt 738, toward inclinable sections 736, 750, after oilfield material is delivered through an inlet opening, such as 664. While belt 738 is shown, it will be appreciated by persons of ordinary skill in the art, horizontal section 732 may include an auger, a conveyor belt with a smooth surface, or with cleated features for oilfield material transfer, or combinations thereof. Further, the inclinable sections 736, 750 may positioned at an upwardly inclined (non-zero, positive angle) with respect to the horizontal sections 738.

Figure 15:
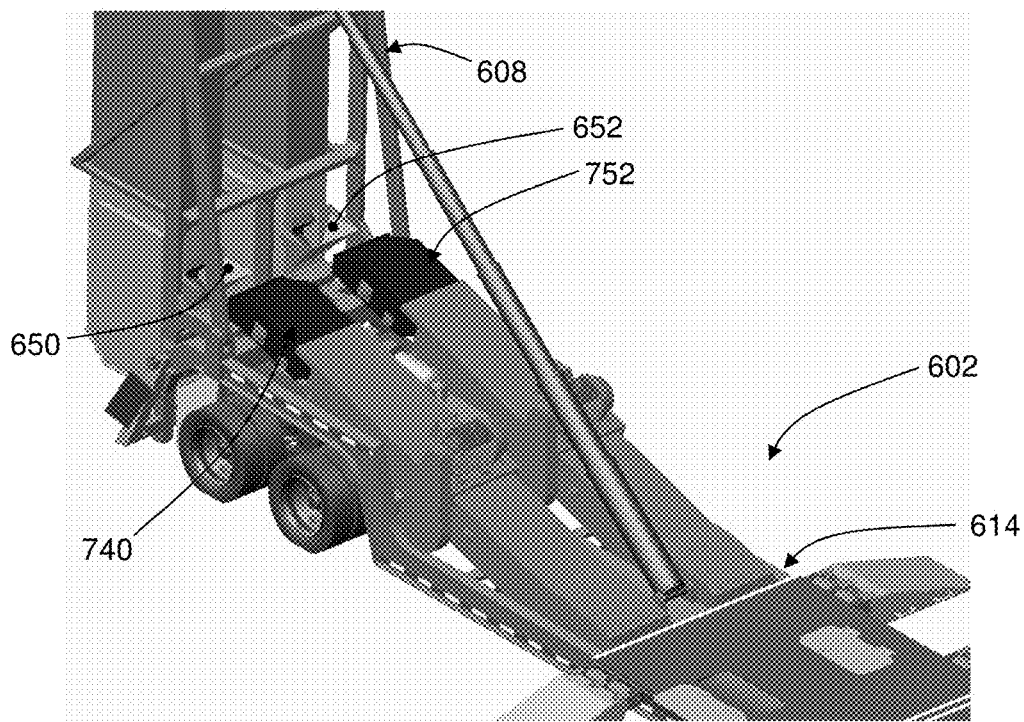
FIG. 15 is a perspective view of a horizontal conveyor system with a telescoping neck in a retracted position, according to an embodiment of the disclosure.
Figure 16:
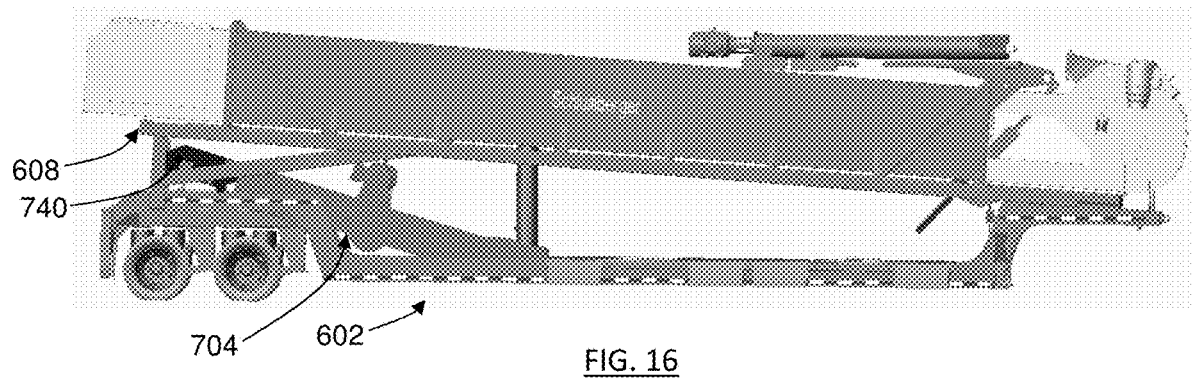
FIG. 16 is a perspective view of a horizontal conveyor system with a telescoping neck in a retracted position and a mast assembly lowered down onto a chassis in a stowed/on-road configuration, according to an embodiment of the disclosure.

FIG. 15 shows the telescoping necks 740, 752 of conveyor systems 704, 706 retracted in preparation for moving mast 608 into a stowed/on-road orientation, or alternatively, when raise from a stowed/on-road orientation. Bucket elevator inlets 650, 652 are shown exposed and disengaged from telescoping necks 740, 752, which may allow for the free movement of mast assembly 608. FIG. 16 illustrates mast assembly 608 lowered down onto chassis 602 in a stowed/on-road configuration, with telescoping necks 740, 752 (not shown) of conveyor systems 704, 706 (not shown) in a retracted orientation.

Figure 17:
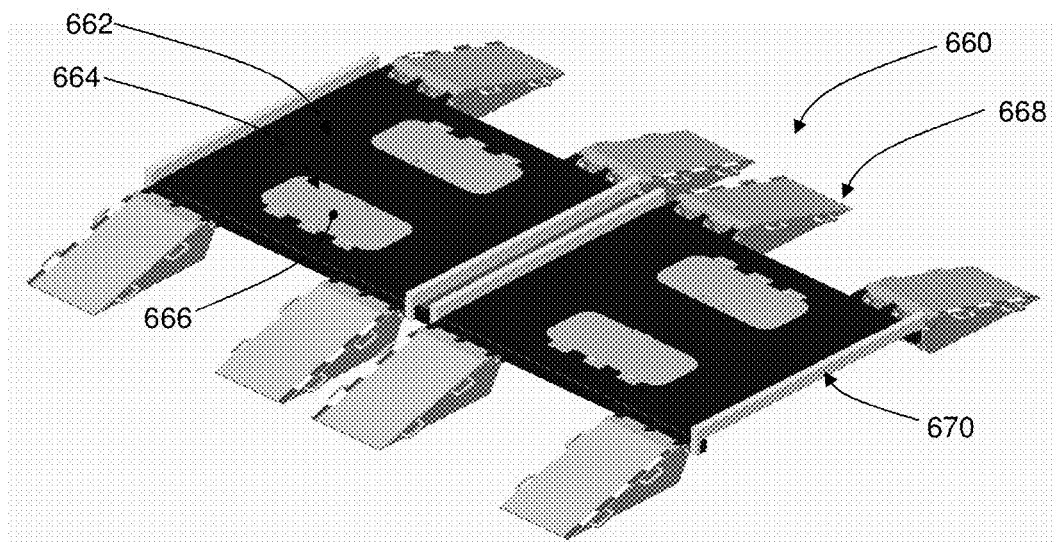
FIG. 17 is a perspective view of an access deck which may be disposed on a chassis of a mobile oilfield material transfer unit, according to an embodiment of the disclosure.

FIG. 17 depicts an access deck which may be disposed on chassis 602, in accordance with some embodiments of the disclosure. Access deck 660 includes surface 662. Disposed on the surface are inlet openings 664 (four shown) in the deck plating with individual cover lids 666. Inlet openings 664 may be useful for delivering oilfield material to horizontal sections 632, 634 of conveyor systems 604, 606.

Figures 18A, 18B:
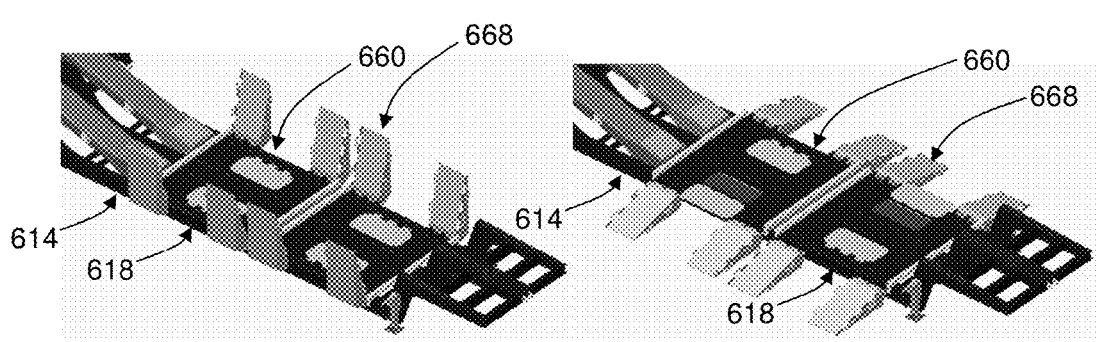
FIGS. 18A and 18B are perspective views of an access deck disposed on a chassis of a mobile oilfield material transfer unit, according to an embodiment of the disclosure.

Cover lids 666 may be useful to prevent unwanted material ingress into inlet openings 664 that are unused. Access deck 660 further includes at least one ramp 668 (eight shown), to enable access to the surface 662 for any suitable purpose, for example, delivering oilfield materials to the conveyor systems 604, 606. Ramp 668 may be movably connected to surface 662 by any suitable means, and in some aspects, ramp 668 is connected to a perimeter side of surface 662 by hinges. Access deck 660 may further include guides 670 (four shown) extending from the surface to help ensure equipment accessing deck 660 remains securely thereupon. FIGS. 18A and 18B show access deck 660 disposed upon support base 614 of chassis 602 at first portion 618, and ramps 668 are shown in a stowed position (FIG. 18A) and operational position (FIG. 18B). Access deck 660 may be connected to support base 614 by any suitable technique, including, but not limited to bolts, pins, weld, and the like, or any combination thereof. In some aspects of the disclosure, access deck 660 is removable to enable access the conveyor belts or other components, as necessary for servicing, replacement, etc. Further, ramps 668 may fold up and pinned to lock vertically in place for stowing during on-road travel.

Referring again to FIG. 9, mobile oilfield material transfer unit 600 includes erecting mast assembly 608 coupled to chassis 602, and may further be configured to erect vertical conveyor assemblies 610, 612 to an upright or vertical operational position for conveying oilfield material into a silo (which may be a modular silo, or array of modular silos), as discussed in more detail with reference to FIGS. 21 through 25 below. The chassis 602 may cooperate with the erecting mast assembly 608 to move the vertical conveyor assemblies 610, 612 from a horizontal or transport position on the chassis 602 to an upright or vertical operational position. In some embodiments the chassis 602 may also be configured to be docked or otherwise aligned with a modular silo, similar to that described above. The mast 672 may be supported by outer beam rails 624, 626 of support base 614 at points 676 and a distal end of the chassis 602. The erecting mast assembly 608 may include a mast 672 and actuator system 674 engaging the mast 672 and the chassis 602. The erecting mast assembly 608 is configured to lay substantially parallel with the support base 614, and supported, at least in part, by gooseneck portion 616 when chassis 602 is transported in stow orientation. Further, mast 672, while lying flat above the trailer gooseneck portion 616, is designed to be clear of the two horizontal conveyor systems 604, 606 when stowed, as well as upon deployment to the upright or vertical operational position. The range of motion of the erecting mast assembly 608 may extend from substantially horizontal to slightly past vertical (e.g., more than a 90 degree range of motion) when deployed to account for angular misalignment due to ground height differences. The erecting mast assembly 608 may be formed from steel tubing, beam, channel, I-beam, H-beam, wide flange, universal beam, rolled steel joist, or any other suitable material and shape.

As shown further in FIG. 9, second portion 620 of support base 614 may be movably connected to the mast 672 via one or more mechanical linkages attached to the mast 672, and one or more actuators systems 674. In some embodiments the actuator systems 674 may be implemented as hydraulic or pneumatic actuators. It is to be understood that the mechanical linkages may be implemented in a variety of manners, such as rails, hydraulic or pneumatic arms, gears, worm gear jacks, cables, or combinations thereof. Mast 672 may further have shrouds 678 integrated therewith to house bucket elevator belts and buckets within, as well as attachment structures at both ends of mast 672 to allow for bucket elevator heads 682 and boots 680 to be individually installed. Elevator belts and buckets contained within shrouds 678 may be utilized to move oilfield material from inlet hoppers 650, 652 to bucket elevator heads 682. Mast 672 may even further include mechanism 684 for mechanically securing mast 672 with chassis in either the horizontal on-road or vertical deployed configuration for mechanical stability on the road or during operational use.

Figure 19:
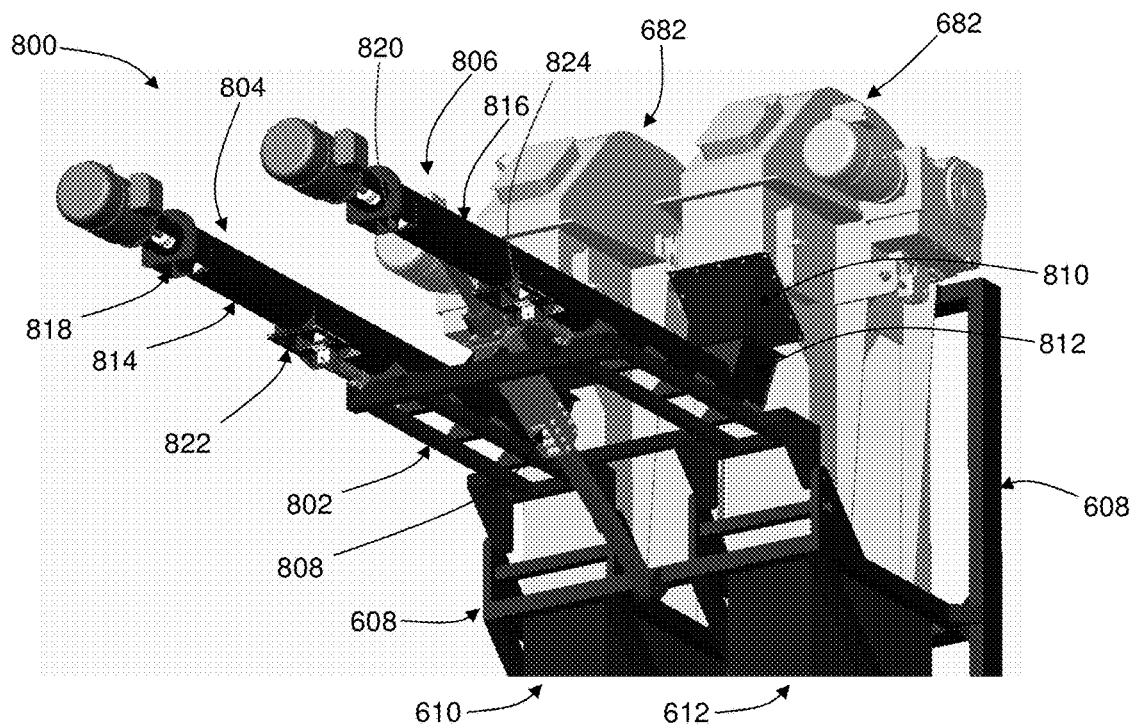
FIG. 19 is a perspective view of an auger conveyor arrangement, according to an embodiment of the disclosure.

Now referring to FIG. 19, which illustrates an auger conveyor arrangement 800 disposed proximal to the discharge outlets near the top of the bucket elevators, in an operational orientation. Auger conveyors 804, 806 (also shown in FIG. 9) are disposed onto, and supported by, an articulated support frame 802. Support frame 802 may be supported by and movably connected with mast assembly 608 thus enabling support frame 802 to move to/from an operational and stowed orientation. Support frame 802 may further include an articulation mechanism 808 for moving the auger conveyor arrangement 800 into a desired position. Articulation mechanism 808 may be any suitable device including, hydraulic, pneumatic, drive screw, or any other mechanical actuation means, which moves support frame 802 to any securable position at any point in the range of motion. Support frame 802 is generally disposed proximal to the discharge chutes 810 (one shown) of bucket elevator heads 682. In an operational position, inlet hoppers 812 (one shown) engage discharge chutes 810 to receive oilfield materials from vertical conveyor assemblies 610, 612.

Auger conveyors 804, 806 further include auger conveyor conduits 814, 816 with augers disposed therein for moving oilfield material from inlet hoppers 812 through the auger conveyor arrangement 800. Disposed upon auger conveyor conduits 814, 816, are openings 818, 822 and 820, 824 respectively, useful for delivering oilfield materials to silos, such as modular silos 516. Openings 822 and 824 may further include knifegate mechanisms to regulate oilfield material transfer through openings 818, 822, 820 and 824.

Figure 20:
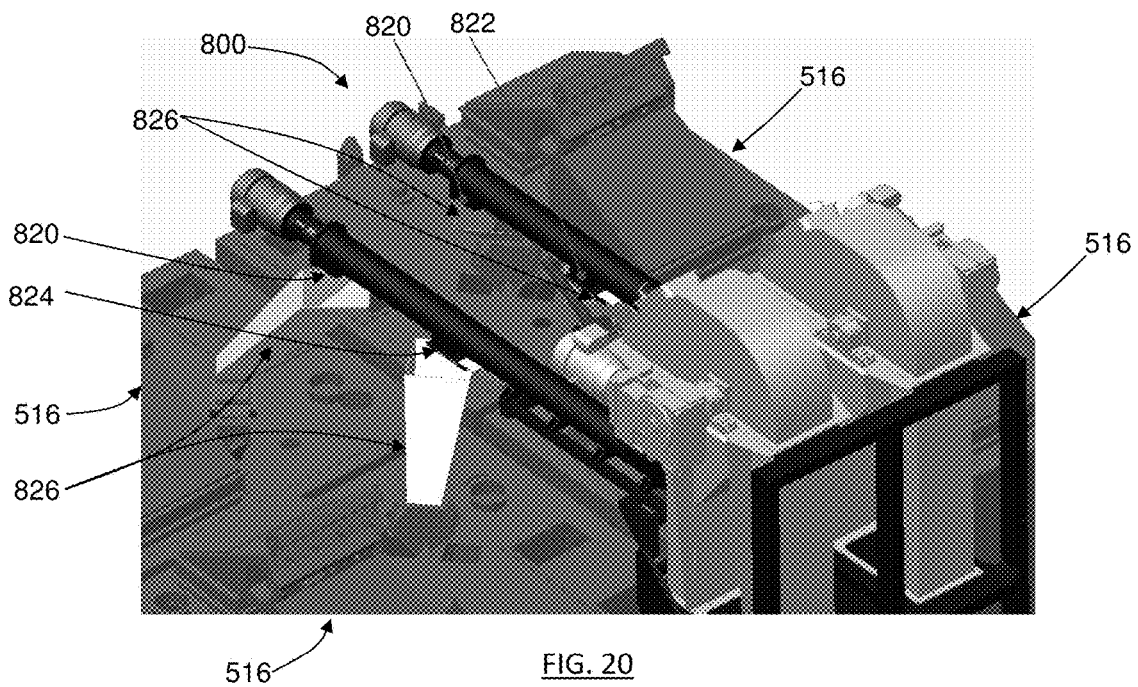
FIG. 20 is a perspective view of an auger conveyor arrangement positioned upon mobile silos, according to an embodiment of the disclosure; and, FIGS. 21 through 25 are perspective views, which together depict how a mobile oilfield material transfer unit may be deployed into operation, according to some aspects of the disclosure.

Referring to FIG. 20, auger conveyor arrangement 800 is positioned over mobile silos 516 (four shown), and each of silos 516 includes receiving chutes 826 (four shown) disposed upon the top end of silos 516 Openings 818, 822, 820 and 824 are positioned adjacent receiving chutes 826. Oilfield material may be received by inlet hoppers 812, travel through the auger conveyor arrangement 800 by auger conveyor conduits 814, 816, discharge at one or more of openings 818, 822, 820 and 824, and then be received by one or more of silos 516 through receiving chutes 826.

Figure 21:
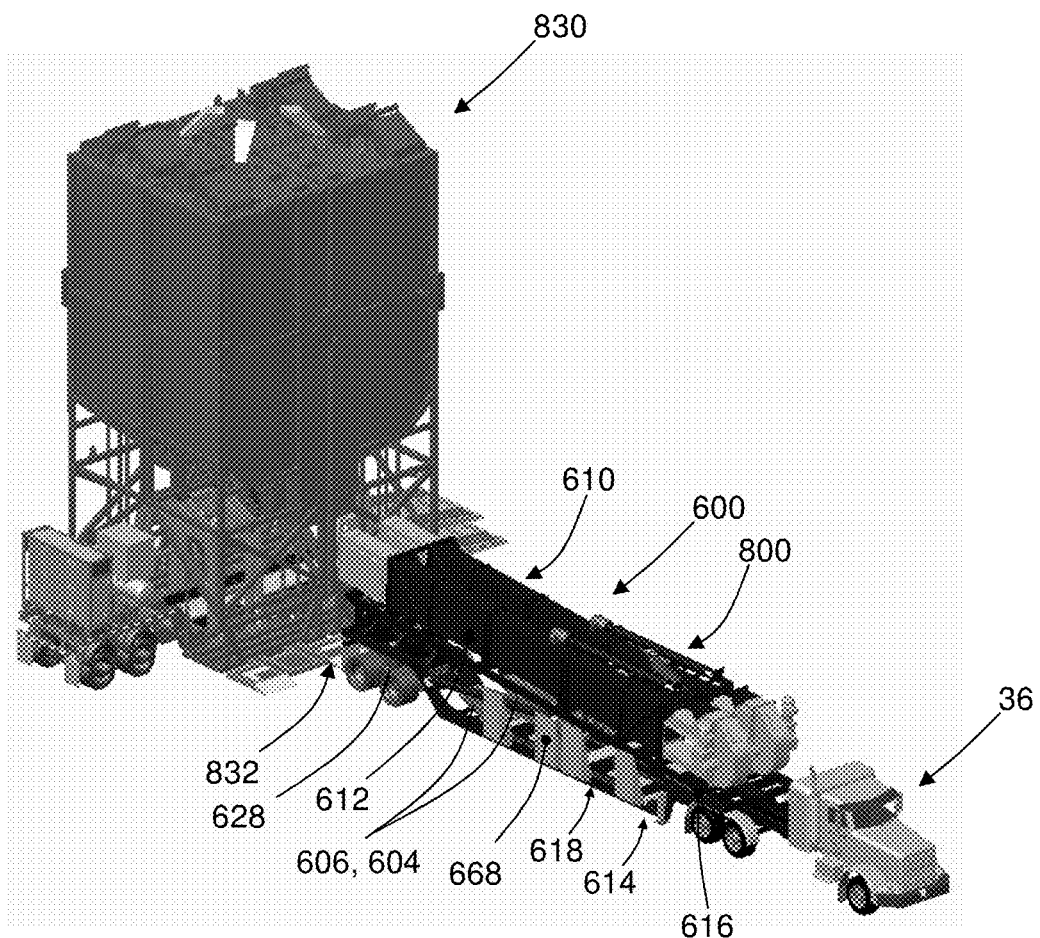
Figure 22:
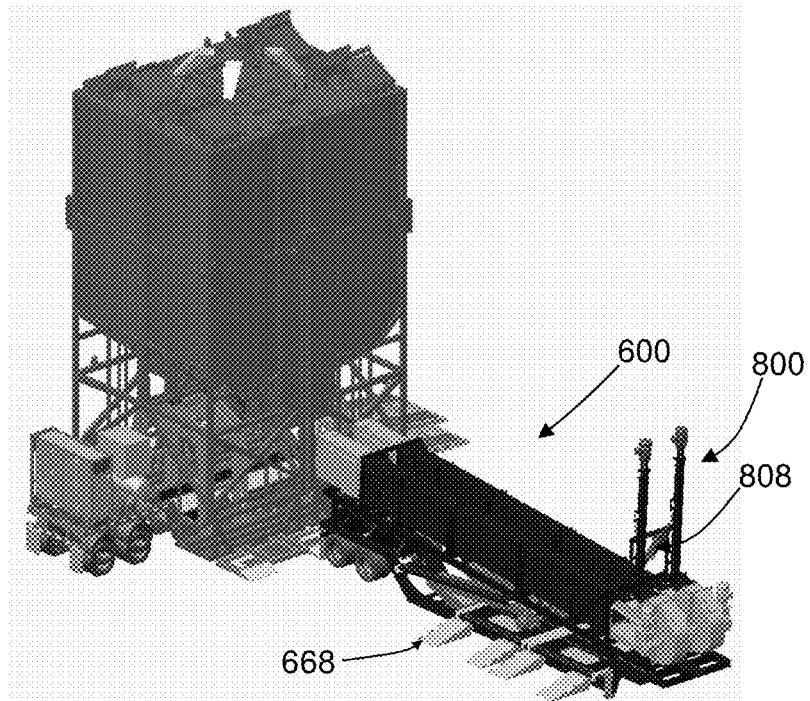

FIGS. 21 through 25 together depict how mobile oilfield material transfer unit 600 may be deployed into operation, according to some aspects of the disclosure. Referring to FIG. 21, mobile oilfield material transfer unit 600 is positioned by tractor 36 to dock adjacent, or upon, support frame extended base(s) 832, and the mobile oilfield material transfer unit 600 is also positioned adjacent an array of modular silos 830 (four shown). Vertical conveyor assemblies 610, 612, horizontal conveyor systems 604, 606 (or 704, 706 in an alternate embodiment), ramps 668 (four shown), and auger conveyor arrangement 800 are in a stowed orientation, while collapsible rear axle suspension system 628 is in an extended position. Rear axle suspension system 628 may then be collapsed to lower at least a part of first portion 618 of support base 614 onto a firm surface, such as the ground, as well as tractor 36 detached from gooseneck portion 616 and removed from the proximity. In some further aspects, collapsing the rear axle suspension system 628 may further enable the second portion 620 of support base 614 to be disposed upon, and even couple with, support frame extended base(s) 832. As shown in FIG. 22, ramps 668 are lowered from the stow position and rested upon the ground, as well as auger conveyor arrangement 800 articulated into an operational position by mechanism 808. In some other embodiments, the mobile oilfield material transfer unit 600 is positioned by tractor 36 adjacent an array of modular silos 830, then erected and firmly positioned on a firm surface, such as a support base or the ground.

Figure 23:
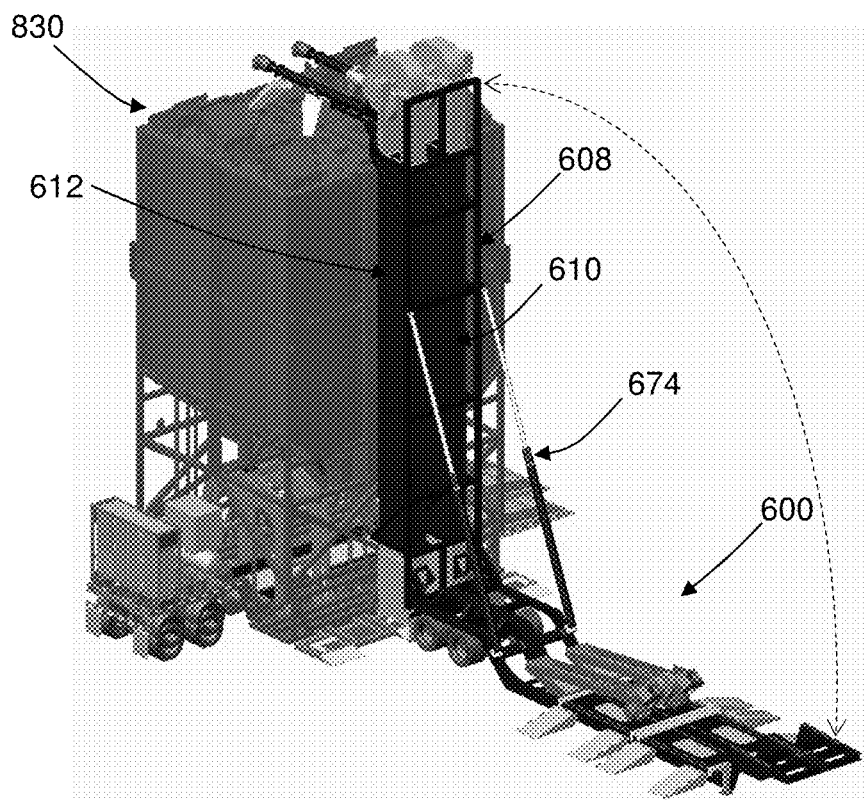
Figure 24:
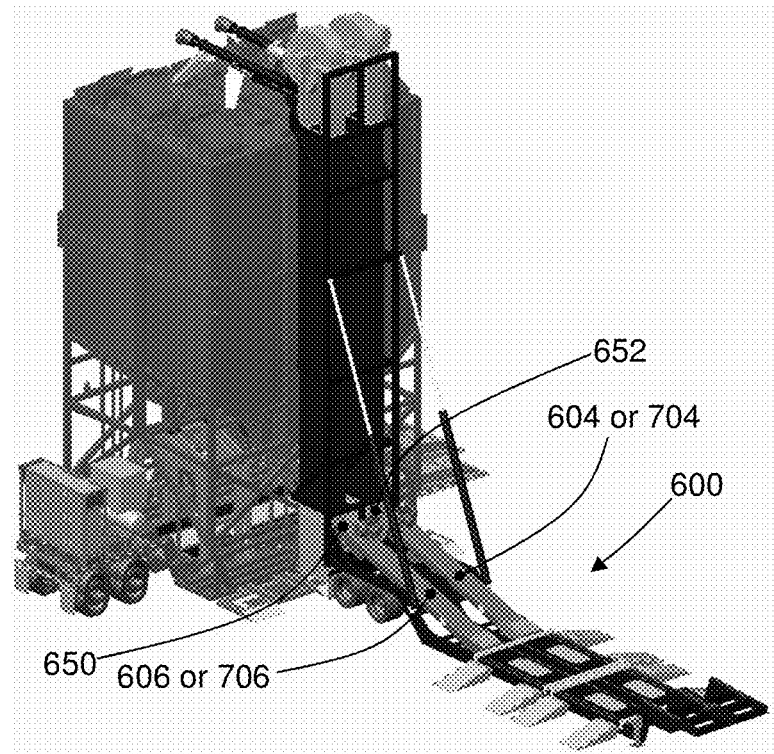
Figure 25:
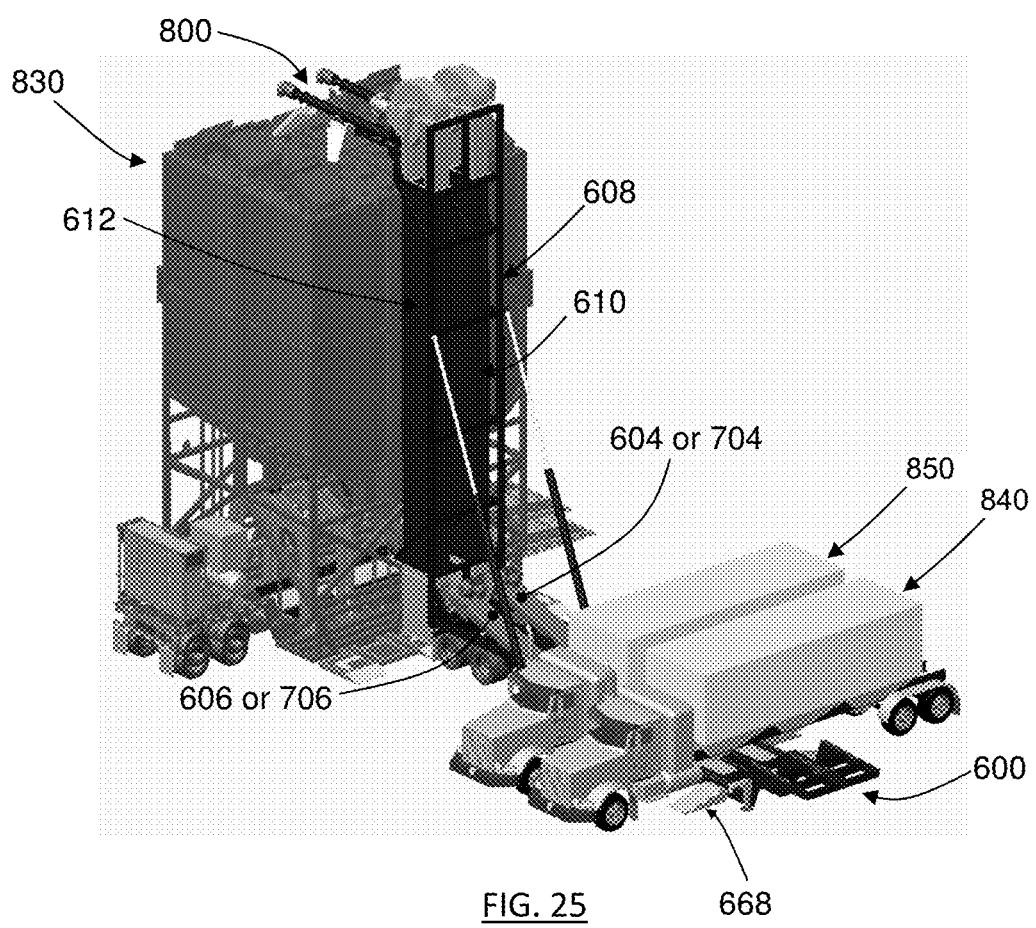

Now with reference to FIG. 23, mast assembly 608 and vertical conveyor assemblies 610, 612 are erected by actuator system 674 from a stowed position in an arcing motion into an operational orientation over the array of modular silos 830. Vertical conveyor assemblies 610, 612 may further couple with support frame extended base(s) 832. Once vertical conveyor assemblies 610, 612 are in operational position, horizontal conveyor systems may be deployed into operational position as shown in FIG. 24. Horizontal conveyor systems 604, 606 (or 704, 706 for systems with telescoping necks as depicted in FIGS. 13 through 15) are unfolded (or extended for systems with telescoping necks) into an operational position and engage inlet hoppers 650, 652. Referring now to FIG. 25, once mobile oilfield material transfer unit 600 is positioned and docked relative modular silos 830 (four shown), and vertical conveyor assemblies 610, 612, horizontal conveyor systems 604, 606 (or 704, 706), ramps 668 (four shown), auger conveyor arrangement 800 are in an operational orientation, oilfield material haulers 840, 850 (two shown) may access and deliver oilfield materials to horizontal conveyor systems 604, 606 (or 704, 706). While FIGS. 21 through 25 depicts one non-limiting example of deploying a mobile oilfield material transfer unit into an operational mode, it will be appreciated by those of skill in that art that it is within the scope of the disclosure to deploy mobile oilfield material transfer unit into operation by any feasible sequence of steps.

Referring again to FIGS. 21-25, some embodiments disclosed are mobile material delivery systems which include at least two movable silos, each silo comprising an outer housing and a frame, and at least one vertical conveyor assembly for delivering materials to the at least two movable silos, where the number of vertical conveyor assemblies is at least one less than the number of movable silos. In FIG. 21, movable silos 830 (four shown), which may be modular silos, are depicted in an upright operational orientation. Two vertical conveyor assemblies 610, 612, are shown in a stowed orientation, while in FIG. 23 vertical conveyor assemblies 610, 612 are depicted in an operational orientation adjacent movable silos 830. While four movable silos are shown, it is within the spirit and scope of the disclosure that the number of movable silos of the system may be any number, as long as the number of movable silos is at least one greater than the number of vertical conveyor assemblies. For example, where four movable silos are present, there may be one, two or three vertical conveyor assemblies for transferring materials into the silos; where there are six movable silos, there may be one, two, three, four or five vertical conveyor assemblies; and the like. Movable silos may be of any suitable design, for example, including, but not limited to, modular silos described in U.S. patent application Ser. No. 14/318,095 filed Jun. 27, 2014, the disclosure of which is incorporated by reference herein in its entirety. Some other non-limiting examples of movable silos include the storage bins and trailers described in U.S. Pat. Pub. No. 20130142601A1, the storage systems disclosed in U.S. Pat. No. 8,734,081B2, the transportable bins described in U.S. Pat. Pub. No. 20120134772A1, the transportable apparatus disclosed in U.S. Pat. Pub. No. 20120024738A1, and the portable storage silo described in U.S. Pat. No. 8,651,792B2, all of which are incorporated by reference in their entirety herein. Any combination of suitable movable silo designs may be used as well. Variations in design and construction of suitable movable silos readily apparent to those of skill in the art are within the scope of the disclosure.

The vertical conveyor assemblies may convey materials to the movable silos by any effective mechanism, such as a bucket elevator, belts, auger, pneumatic, and the like. With reference to FIGS. 21-25, two such vertical conveyor assemblies, 610, 612, are shown, which are bucket elevators. In some aspects of mobile material delivery systems, where the number of the at least one vertical conveyor assemblies is at least one less than the number of the at least two movable silos, the at least one vertical conveyor assembly includes a bucket elevator with a gravity dump hauler, and the at least one vertical conveyor assembly is configured to enable substantially dust-free loading of the at least two movable silos.

The mobile material delivery systems may further include a mobile support structure, for example those described in U.S. patent application Ser. No. 14/318,095, where the mobile support structure is configured to receive and convey oilfield material to the at least one vertical conveyor assembly. Each of the at least one vertical conveyor assemblies may be movably coupled with a support base, 614, of a trailer chassis, and have a mechanism for moving the silo between travel/stowed and operational orientations.

In some embodiments, the trailer chassis includes a trailer bed, a flipper mechanism coupled to the trailer bed, a rocker arm coupled to the trailer bed and the flipper mechanism, a first hook plate and a second hook plate attached to the flipper mechanism, where the first hook plate and the second hook plate are laterally opposed to each other on the flipper mechanism and wherein the first hook plate and the second hook plate are oriented at a first non-zero angle with respect to each other. Each of the at least two movable silos of the mobile material delivery systems may include a plurality of support legs, a first pin and a second pin attached to the plurality of support legs, the first pin coupleable to the first hook plate and the second pin coupleable to the second hook plate.

In yet other embodiments, the trailer chassis has a first end, a second end, at least one support beam extending between the first end and the second end, and the chassis further includes a rear axle suspension system coupled with the at least one support beam for movably supporting the at least one support beam. An erecting mast assembly 608 may be included which has a mast movably connected with the chassis proximate to the second end, and an actuator system coupled with the mast and with the chassis for moving the mast between a horizontal position and a vertical position. The vertical conveyor assembly, 610 and/or 612, may have a support frame coupled with the mast and moveable between the horizontal position and the vertical position, where the at least one vertical conveyor assembly is coupled with the support frame, and has an inlet, and an upper discharge portion. The at least one vertical conveyor is adapted to move a volume of oilfield material from the inlet to the upper discharge portion.

Some further embodiments of the disclosure include methods of transporting, transferring, storing, delivering, or handling oilfield materials to or at a well-site, as part of the preparation of treatment fluids useful in treating subterranean formations, using the apparatus, and combinations thereof, described in and within the scope of the disclosure.

Some methods include providing at least one mobile oilfield material transfer unit to a well-site in a stowed orientation, where each of the at least one mobile oilfield material transfer units includes at least one vertical conveyor assembly moveable between a horizontal position and a vertical position. At least two movable silos are provided to a well-site in a stowed orientation providing at least. The at least two movable silos are erected, or otherwise deployed, into an operational orientation, and the at least one vertical conveyor assembly is erected, or otherwise deployed, into an operational orientation adjacent the at least two movable silos. An oilfield material is delivered to the at least one vertical conveyor assembly by any suitable means. In some instances, the oilfield material is delivered to the at least one vertical conveyor assembly through at least one horizontal conveyor system. The oilfield material may then be transferred to the at least two movable silos through the at least one vertical conveyor assembly. The number of the at least one vertical conveyor assemblies is at least one less than the number of the at least two movable silos.

Another embodiment in accordance with the disclosure is a method of providing a mobile oilfield material transfer unit to a well-site in a stowed orientation, where the mobile oilfield material transfer unit comprising at least one vertical conveyor assembly coupled with an erecting mast and moveable between a horizontal position and a vertical position. The mobile oilfield material transfer unit further includes at least one horizontal conveyor system, at least one auger conveyor, and at least one ramp. The mobile oilfield material transfer unit is deployed into an operational orientation adjacent at least one silo, and oilfield material is delivered to the at least one horizontal conveyor system. The oilfield material is then transferred to the at least one silo through the mobile oilfield material transfer unit.

Apparatus and methods according to the invention may be associated with, and/or include, other well-site equipment useful for treating a subterranean formation. Examples of such equipment include, but is not limited to, a blender disposed adjacent and in fluid communication with the silos, bulk viscosifier storage and handling units, bulk chemical storage units, bulk fiber handling systems, liquid storage units, centralized electric power delivery units, fracturing tanks, process control systems, fluid pumping systems, high pressure manifolds, and the like. Other equipment, as will be readily apparent to those of skill in the art, is within the spirit and scope of the disclosure as well.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A mobile oilfield material transfer unit, comprising:
a chassis having a gooseneck and support base, the gooseneck generally coplanar with the support base when in a ramp configuration to facilitate oilfield material transport to the support base, the chassis further including a first end, a second end, at least one support beam extending between the first end and the second end, and the chassis further comprising a rear axle suspension system coupled with the at least one support beam for movably supporting the at least one support beam, wherein the at least one support beam further comprises a first support beam and a second support beam extending between the first end and the second end and being separated by a gap;
an erecting mast assembly including a mast movably connected with the chassis proximate to the second end, and an actuator system coupled with the mast and with the chassis for moving the mast between a horizontal position and a vertical position adjacent a silo;
a first conveyor assembly including a support frame coupled with the mast and moveable between the horizontal position and the vertical position, the first conveyor assembly including a first conveyor coupled with the support frame, an inlet, and an upper discharge portion, the first conveyor adapted to move a volume of oilfield material from the inlet to the upper discharge portion, wherein the support frame further comprises one or more silo-engaging members shaped to connect with a predetermined portion of the silo when the support frame and the mast have been moved to the vertical position adjacent the silo; and a second conveyor system including a second conveyor having a horizontal section with an inlet and an inclinable section pivotably connected to the horizontal section and configured to move a volume of oilfield material toward the inlet of the first conveyor assembly when the support frame and the mast are moved to the vertical position, wherein the second conveyor system is at least partially positioned in the gap.

2. The mobile oilfield material transfer unit of claim 1, wherein the inlet of the first conveyor assembly is below and proximate to a discharge of the inclinable section of the second conveyor system.

3. The mobile oilfield material transfer unit of claim 1, wherein the first conveyor assembly further comprises a discharge chute coupled with the upper discharge portion of the first conveyor assembly.

4. The mobile oilfield material transfer unit of claim 3, wherein the discharge chute comprises a first outlet and a second outlet and a diverter valve for selectively directing the volume of oilfield material though at least one of the first and second outlet.

5. The mobile oilfield material transfer unit of claim 1, wherein the first conveyor assembly further comprises a pivoting conveyor assembly movably associated with the upper discharge portion.

6. The mobile oilfield material transfer unit of claim 5, wherein the support frame is movably coupled with the mast and further comprises at least one actuator for moving the support frame relative to the mast.

7. The mobile oilfield material transfer unit of claim 1, wherein the rear axle suspension system is a collapsible suspension system.

8. The mobile oilfield material transfer unit of claim 1, wherein the second conveyor system is configured to be folded into a stowed position when the support frame and the mast are moved to the horizontal position.

9. A mobile oilfield material transfer unit, comprising:
a chassis having a gooseneck and a support base, the support base including a first portion and a second portion, the gooseneck generally coplanar with the support base when in a ramp configuration to facilitate oilfield material transport to the support base, and the chassis further comprising a rear axle suspension system coupled with at least two wheels for movably supporting the chassis;

an erecting mast assembly including a mast movably connected with the chassis proximate to the second portion, and an actuator system coupled with the mast and with the chassis for moving the mast between a horizontal position and a vertical position adjacent a silo;

at least two vertical conveyor assemblies coupled with the erecting mast assembly and moveable between the horizontal position and the vertical position, wherein each of the at least two vertical conveyor assemblies comprises a discharge chute configured to be disposed adjacent the silo; and at least two horizontal conveyor systems coupled with the support base and engageable with the at least two vertical conveyor assemblies, each of the at least two horizontal conveyor systems having a horizontal section with an inlet and an inclinable section pivotably connected to the horizontal section and configured to move a volume of oilfield material toward an inlet hopper of each of the at least two vertical conveyor assemblies when the mast is moved into the vertical position.

10. The mobile oilfield material transfer unit of claim 9, wherein the chassis comprises a central box beam structure and two outer beam rails, and wherein the central box beam structure is separated by a gap from each of the two outer beam rails.

11. The mobile oilfield material transfer unit of claim 10, wherein the central box beam structure and the two outer beam rails extend across the second portion, the first portion, and the gooseneck.

12. The mobile oilfield material transfer unit of claim 10, wherein each of the at least two horizontal conveyor systems is at least partially positioned in the gap formed between the central box beam structure and each of the two outer beam rails.

13. The mobile oilfield material transfer unit of claim 9, wherein each inclinable section comprises a telescoping neck.

14. The mobile oilfield material transfer unit of claim 9, further comprising an access deck disposed upon the support base and at least one ramp movably connected with a perimeter side of the access deck.

15. The mobile oilfield material transfer unit of claim 9, wherein each of the at least two vertical conveyor assemblies further comprises a bucket elevator, and a bucket elevator head.

16. The mobile oilfield material transfer unit of claim 15, wherein each of the at least two vertical conveyor assemblies further comprises an auger conveyor disposed proximate the bucket elevator head and in communication with the bucket elevator, the auger conveyor further comprising at least one opening configured to deliver oilfield materials to a receiving chute of the silo.

17. The mobile oilfield material transfer unit of claim 9, wherein the rear axle suspension system is a collapsible suspension system.

18. The mobile oilfield material transfer unit of claim 17, wherein the second portion is configured to couple with at least one extended base of a support frame for supporting the at least two vertical conveyor assemblies in the vertical position.

19. The mobile oilfield material transfer unit of claim 9, wherein the at least two horizontal conveyor systems are configured to be folded into a stowed position when the mast is moved to the horizontal position.

* * * * *